(12) United States Patent  
Yu et al.

(10) Patent No.: US 12,516,873 B2
(45) Date of Patent: Jan. 6, 2026

(54) COLOR CHANGING REFRIGERATOR, COLOR CHANGING HOME APPLIANCE, AND CONTROL METHOD FOR SAME

(71) Applicant: Samsung Electronics Co., Ltd., Suwon-si (KR)

(72) Inventors: Odo Yu, Suwon-si (KR); Hani Yang, Suwon-si (KR); Jaeyu Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 18/302,424

(22) Filed: Apr. 18, 2023

(65) Prior Publication Data

US 2023/0258388 A1 Aug. 17, 2023

Related U.S. Application Data

(63) Continuation of application No. PCT/KR2021/013406, filed on Sep. 29, 2021.

(30) Foreign Application Priority Data

Nov. 26, 2020 (KR) .................. 10-2020-0161381
Jul. 22, 2021 (KR) .................. 10-2021-0096747

(51) Int. Cl.
*F25D 29/00* (2006.01)
*F25D 23/02* (2006.01)
(Continued)

(52) U.S. Cl.
CPC ............. *F25D 29/00* (2013.01); *F25D 23/02* (2013.01); *F25D 23/028* (2013.01);
(Continued)

(58) Field of Classification Search
CPC ...... F25D 23/028; F25D 27/005; F25D 29/00; F25D 2323/021; F25D 2327/001; F25D 2400/18; F25D 2400/36; F25D 2400/361
See application file for complete search history.

(56) References Cited

U.S. PATENT DOCUMENTS 6,032,494 A 3/2000 Tanigawa et al.
9,368,062 B2 6/2016 Zhang
(Continued)

FOREIGN PATENT DOCUMENTS

CN 101907380 A 12/2010
CN 202217116 U 5/2012
(Continued)

OTHER PUBLICATIONS

KR 10-2005-0095359 (English translation) (Year: 2005).*
(Continued)

*Primary Examiner* — Jonathan Bradford
(74) *Attorney, Agent, or Firm* — Jefferson IP Law, LLP

(57) ABSTRACT

A refrigerator and a home appliance, of which the exterior design can be changed without replacing an exterior panel by changing the exterior design using an electrophoretic display (EPD) panel. The refrigerator includes a storage compartment, a door for opening and closing the storage compartment, and including a door body and an electrophoretic display (EPD) panel located in front of the door body, and a processor for controlling the electrophoretic display panel to change color based on at least one of a user's selection or an operation state.

20 Claims, 23 Drawing Sheets

(51) Int. Cl.
  *F25D 27/00* (2006.01)
  *G02F 1/153* (2006.01)
  *G02F 1/167* (2019.01)

(52) U.S. Cl.
  CPC ........... *F25D 27/005* (2013.01); *G02F 1/153* (2013.01); *G02F 1/167* (2013.01); *F25D 2323/021* (2013.01); *F25D 2327/001* (2013.01); *F25D 2400/18* (2013.01); *F25D 2400/36* (2013.01); *F25D 2400/361* (2013.01); *F25D 2700/00* (2013.01)

(56) References Cited

U.S. PATENT DOCUMENTS

| | | | |
|---|---|---|---|
| 9,689,603 | B2 | 6/2017 | Roh et al. |
| 9,909,801 | B2 | 3/2018 | Cheon et al. |
| 9,984,660 | B2 | 5/2018 | Kim et al. |
| 10,215,993 | B2 | 2/2019 | Seung et al. |
| 10,565,925 | B2 | 2/2020 | Perdices-Gonzalez et al. |
| 10,724,732 | B2 | 7/2020 | Schenkl et al. |
| 2006/0096303 | A1 | 5/2006 | Kavounas |
| 2011/0304466 | A1* | 12/2011 | Bair, III ............... F25B 49/00 62/126 |
| 2012/0133672 | A1 | 5/2012 | Joo |
| 2013/0050992 | A1* | 2/2013 | Schneider ............ G02B 6/0031 362/100 |
| 2018/0266751 | A1* | 9/2018 | Lim ...................... F25D 23/028 |
| 2018/0359343 | A1 | 12/2018 | Lee et al. |
| 2021/0270519 | A1 | 9/2021 | Yoon |

FOREIGN PATENT DOCUMENTS

| | | |
|---|---|---|
| CN | 103488020 A | 1/2014 |
| CN | 205139897 U | 4/2016 |
| CN | 207610458 U | 7/2018 |
| JP | 2002-336594 A | 11/2002 |
| JP | 4642043 B2 | 3/2011 |
| JP | 6485781 B2 | 3/2016 |
| JP | 6289829 B2 | 3/2018 |
| JP | 2018-077044 A | 5/2018 |
| JP | 2019-032159 A | 2/2019 |
| JP | 6650015 B2 | 2/2020 |
| KR | 20-1999-0036829 U | 9/1999 |
| KR | 10-2005-0095359 A | 9/2005 |
| KR | 10-2007-0008304 A | 1/2007 |
| KR | 10-0679651 B1 | 2/2007 |
| KR | 10-0745777 B1 | 8/2007 |
| KR | 10-0792071 B1 | 1/2008 |
| KR | 10-2008-0035189 A | 4/2008 |
| KR | 10-2010-0041007 A | 4/2010 |
| KR | 10-2012-0116207 A | 10/2012 |
| KR | 10-2014-0039878 A | 4/2014 |
| KR | 10-2014-0125996 A | 10/2014 |
| KR | 10-2015-0071795 A | 6/2015 |
| KR | 10-2016-0118309 A | 10/2016 |
| KR | 10-1705363 B1 | 2/2017 |
| KR | 10-2017-0025972 A | 3/2017 |
| KR | 10-2017-0076435 A | 7/2017 |
| KR | 10-2017-0084447 A | 7/2017 |
| KR | 10-2018-0025047 A | 3/2018 |
| KR | 10-1864003 B1 | 6/2018 |
| KR | 10-2019-0025862 A | 3/2019 |
| KR | 10-2019-0100134 A | 8/2019 |
| KR | 10-2093428 B1 | 3/2020 |
| KR | 10-2149201 B1 | 8/2020 |
| KR | 10-2022-0144562 A | 10/2022 |
| KR | 10-2022-0146241 A | 11/2022 |
| TW | 201038895 | 11/2010 |
| WO | 2013/020808 A2 | 2/2013 |
| WO | 2021/216182 A1 | 10/2021 |

OTHER PUBLICATIONS

KR 10-2019-0100134 (English translation) (Year: 2019).*
KR 10-2019-0036746 (English translation) (Year: 2019).*
JP 2004-69160 (English translation) (Year: 2004).*
European Search Report dated Feb. 16, 2024, issued in European Application No. 21898320.3.
Korean Office Action dated Nov. 25, 2024, issued in Korean Application No. 10-2021-0096747.
Korean Office Action dated Mar. 2, 2023, issued in Korean Patent Application No. 10-2023-0000421.
Korean Notice of Allowance Dated Oct. 30, 2023, issued in Korean Application No. 10-2023-0000421.
Decision of Final Rejection dated Jul. 10, 2025, issued in Korean Application No. 10-2021-0096747.
Chinese Office Action dated Oct. 24, 2025, issued in Chinese Application No. 202180077007.1.

* cited by examiner

| DOOR | OPERATING MODE | COLOR |
|---|---|---|
| UPPER LEFT DOOR | WINE STORAGE MODE | PURPLE |
| UPPER RIGHT DOOR | KIMCHI STORAGE MODE | RED |
| LOWER LEFT DOOR | VEGETABLE STORAGE MODE | GRAY |
| LOWER RIGHT DOOR | MEAT STORAGE MODE | CHARCOAL |

| DOOR | OPERATING TEMPERATURE | COLOR |
|---|---|---|
| UPPER DOOR | -5℃ | SKY BLUE |
| LOWER LEFT DOOR | -10℃ | BLUE |
| LOWER RIGHT DOOR | -15℃ | BLUE |

FIG. 11

| INTERNAL STATE | COLOR |
|---|---|
| ODOR | BLACK |
| OVER CAPACITY | RED |

FIG. 13

| OUTSIDE WEATHER INFORMATION | COLOR |
|---|---|
| SUNNY | SKY BLUE |
| RAINY | BLUE |
| CLOUDY | GRAY |
| SNOWY | WHITE |

| OPERATING TEMPERATURE | COLOR |
|---|---|
| 28℃~30℃ | WHITE |
| 24℃~28℃ | SKY BLUE |
| 18℃~24℃ | BLUE |

| FILTER REPLACEMENT PERIOD | CONCENTRATION OF FINE DUST | COLOR |
|---|---|---|
| LARGE AMOUNT OF TIME LEFT | LOW | WHITE |
| HALF | MIDDLE | BEIGE |
| SMALL AMOUNT OF TIME LEFT | HIGH | ORANGE |

| SATURATION OF DUST | COLOR |
|---|---|
| 0~30 | WHITE |
| 30~80 | GRAY |
| 80~100 | BLACK |

| PROGRESS OF OPERATION | COLOR |
|---|---|
| OFF | WHITE |
| IN PROGRESS | PURPLE |
| COMPLETION | GREEN |

| PROGRESS OF OPERATION | COLOR |
|---|---|
| OFF | WHITE |
| IN PROGRESS | SKY BLUE |
| COMPLETION | BLUE |

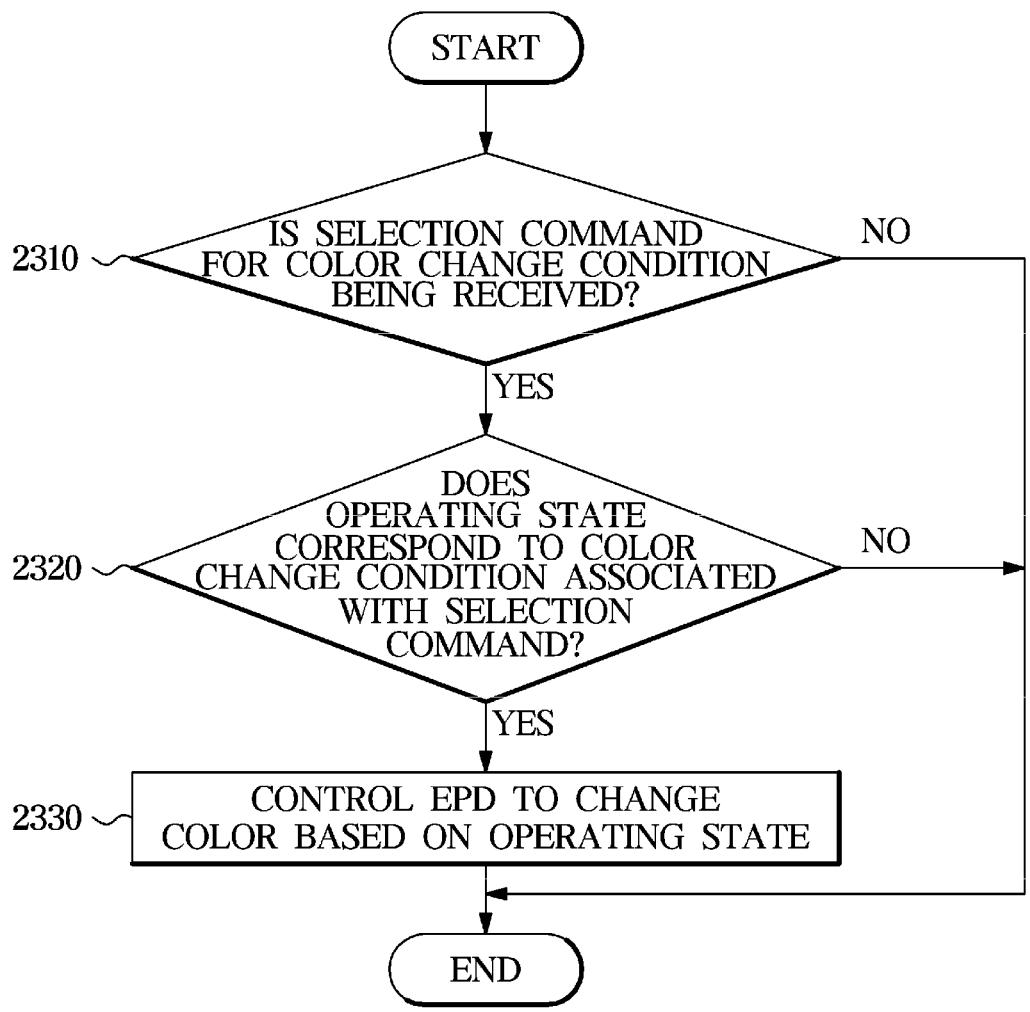

COLOR CHANGING REFRIGERATOR, COLOR CHANGING HOME APPLIANCE, AND CONTROL METHOD FOR SAME

CROSS-REFERENCE TO RELATED APPLICATION(S)

This application is a continuation application, claiming priority under § 365(c), of an International application No. PCT/KR2021/013406, filed on Sep. 29, 2021, which is based on and claims the benefit of a Korean patent application number 10-2020-0161381, filed on Nov. 26, 2020, in the Korean Intellectual Property Office, and of a Korean patent application number 10-2021-0096747, filed on Jul. 22, 2021, in the Korean Intellectual Property Office, the disclosure of each of which is incorporated by reference herein in its entirety.

BACKGROUND

1. Field

The disclosure relates to a refrigerator and a home appliance of which an exterior design thereof is changeable.

2. Description of Related Art

A home appliance refers to a device that is mainly provided in a home of a user to assist the user with housework, and includes a refrigerator, an air conditioner, an air purifier, a vacuum cleaner, a cooking appliance, a dishwasher, a clothes care machine, a washing machine, and the like.

Recently, a home appliance allows replacement of an exterior panel thereof, so as to easily change the exterior design, and a user may change the exterior design of the home appliance by replacing the exterior panel.

However, in order to change an exterior design through replacement of an exterior panel, there is a need to separately purchase an exterior panel and reinstall the exterior panel, which results in loss in terms of cost and time.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a refrigerator and home appliances, of which the exterior design is changeable using an electrophoretic display (EPD) panel so that the exterior design may be changed without replacing an exterior panel.

Additional aspects will be set forth in part in the description which follows and, in part, will be apparent from the description, or may be learned by practice of the presented embodiments.

In accordance with an aspect of the disclosure, a refrigerator is provided. The refrigerator includes a storage compartment, a door provided to open and close the storage compartment and including a door body, an electrophoretic display (EPD) panel located at a front of the door body, and a transparent panel located at a front of the EPD panel, and a processor configured to control the EPD panel to change color based on at least one of a selection by a user or an operating state.

The transparent panel may be provided using one of glass, acrylic, and plastic.

The refrigerator further includes a transceiver, wherein the processor may be configured to, upon a color change command being received from a user terminal through the transceiver, control the EPD panel to change color based on the color change command.

The processor may be configured to, upon a selection command for a color change condition being received from the user terminal through the transceiver, control the EPD panel to change color based on whether an operating state corresponds to the color change condition associated with the selection command.

The processor may be configured to control the EPD panel to change color based on an operating mode of the storage compartment.

The processor may be configured to control the EPD panel to change color based on an operating temperature of the storage compartment.

The processor may be configured to control the EPD panel to change color based on an internal state of the storage compartment.

The processor may be configured to control the EPD panel to alternately change color upon malfunction of the refrigerator.

The processor may be configured to control the EPD panel to change color based on outside weather information.

In accordance with another aspect of the disclosure, a home appliance is provided. The home appliance includes a main body, an electrophoretic display (EPD) panel located on an outer side of the main body, a transparent panel located at a front of the EPD panel, and a processor configured to control the EPD panel to change color based on at least one of a selection by a user or an operating state.

The transparent panel may be provided using one of glass, acrylic, and plastic.

The home appliance may further include a transceiver, wherein the processor may be configured to, upon a color change command being received from a user terminal through the transceiver, control the EPD panel to change color based on the color change command.

The processor may be configured to, upon a selection command for a color change condition being received from the user terminal through the transceiver, control the EPD panel to change color based on whether an operating state corresponds to the color change condition associated with the selection command.

The home appliance may be an air conditioner, and the processor may be configured to control the EPD panel to change color based on an operating mode of the air conditioner.

The home appliance may be an air purifier, and the processor may be configured to control the EPD panel to change color based on a filter replacement period of the air purifier or a concentration of fine dust.

The home appliance may be a vacuum cleaner including a dust collection container, and the processor may be configured to control the EPD panel to change color based on a dust saturation of the dust collection container.

The home appliance may be a cooking appliance, and the processor may be configured to control the EPD panel to change color based on an operating temperature of the cooking appliance.

The home appliance may be any one of a dishwasher, a washing machine, and a clothes care machine, and the processor may be configured to control the EPD panel to change color based on an operation progress of the home appliance.

According to the refrigerator and home appliance according to an embodiment, the exterior design is changed using an electrophoretic display (EPD) panel so that the change of the exterior design can be achieved without replacing an exterior panel.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a diagram illustrating a case in which a refrigerator changes a color of an EPD panel based on an internal state of a storage compartment according to an embodiment of the disclosure;

FIG. 13 is a diagram illustrating a case in which a refrigerator changes the color of an EPD panel based on outside weather information according to an embodiment of the disclosure;

FIG. 23 is a flowchart showing a method of controlling a home appliance, which shows a case of changing a color of an EPD panel based on an operating state according to an embodiment of the disclosure.

The same reference numerals are used to represent the same elements throughout the drawings.

DETAILED DESCRIPTION

Figure 1:
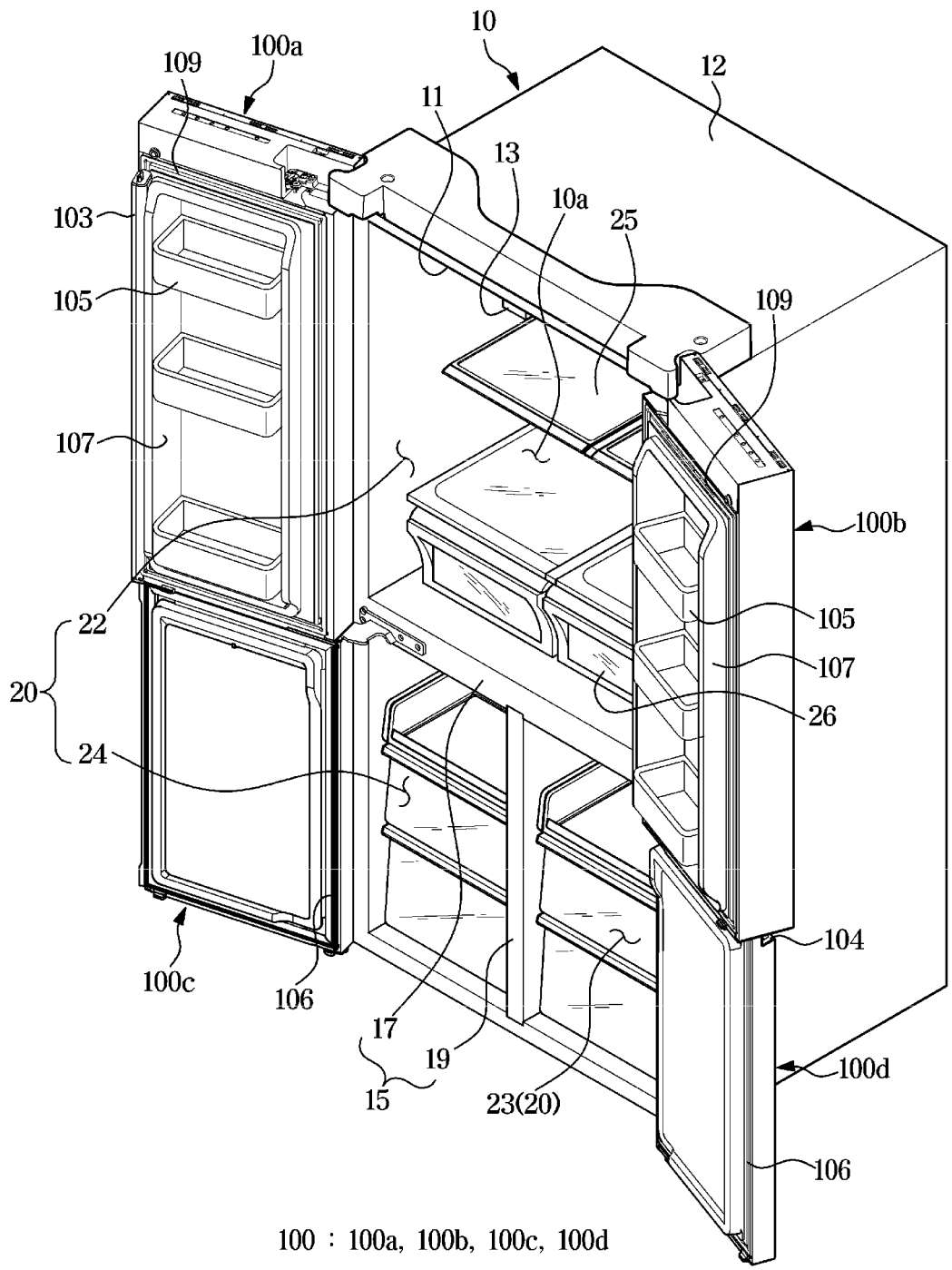
FIG. 1 is a diagram illustrating a refrigerator according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the term "connect" or its derivatives refer both to direct and indirect connection, and the indirect connection includes a connection over a wireless communication network.

In addition, the terms used herein are for the purpose of describing the embodiments and are not intended to restrict and/or to limit the disclosure. In addition, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

In addition, it will be understood that, although the terms first, second, etc. may be used herein to describe various components, these components should not be limited by these terms. These terms are only used to distinguish one component from another. For example, without departing from the scope of the disclosure, the first component may be referred to as a second component, and similarly, the second component may also be referred to as a first component.

In addition, the terms, such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for convenience of explanation, but not to limit an order of the steps. Thus, unless the context clearly dictates otherwise, the written order may be practiced otherwise.

Hereinafter embodiments according to the disclosure will be described in detail with reference to the accompanying drawings.

A home appliance according to the disclosure may be provided with an electrophoretic display (EPD) panel attached to an outer surface thereof, to change the exterior design or color thereof based on an input of a user or an operating state.

Home appliances according to the disclosure may include a refrigerator, an air conditioner, an air purifier, a vacuum cleaner, a cooking appliance, a dishwasher, a clothes care machine, a washing machine, and the like. However, the type of home appliance is not limited to the above example, and any type of device may be included in the disclosure without limitations as long as it can be provided in a house of a user and help the user with housework.

First, a refrigerator is described as a type of the home appliance, and the description of the refrigerator may be applicable to other types of home appliances.

FIG. 1 is a diagram illustrating a refrigerator according to an embodiment of the disclosure.

Referring to FIG. 1, a home appliance 1 according to an embodiment may correspond to a refrigerator 1-1, and the refrigerator 1-1 includes a main body 10 forming the external appearance thereof and a cold air supply device (not shown) for supplying cold air to a storage compartment 20 of the main body 10.

The main body 10 of the refrigerator 1-1 may include the storage compartment 20 partitioned vertically inside the main body 10 and doors 100; 100a, 100b, 100c, and 100d. Opening and closing the doors 100; 100a, 100b, 100c, and 100d allows access and securing of the storage compartment 20.

In addition, the main body 10 may include an inner case 11 forming the storage compartment 20, an outer case 12 coupled to the outside of the inner case to form the external appearance, and a main body heat insulator foam (not shown) between the inner case and the outer case to insulate the storage compartment 20.

The cold air supply device may generate cold air using a cooling circulation period of compressing, condensing, expanding, and evaporating a refrigerant.

The storage compartment 20 may be divided in a plurality of compartments by a partition 15, and may be provided with a plurality of shelves 25 and storage containers 26 inside the storage compartment 20 to store food and the like.

The storage compartment 20 may be divided into a plurality of storage compartments 22, 23, and 24 by the partition 15, and the partition 15 may include a first partition 17 horizontally coupled to the inside of the storage compartment 20 to divide the storage compartment 20 into an upper storage compartment 22 (i.e., a first storage compartment) and lower storage compartments 23 and 24 and a second partition 19 vertically coupled to the lower storage compartments 23 and 24 to divide the lower storage compartments 23 and 24 into a second storage compartment 23 and a third storage compartment 24.

The partition 15 provided in a T-shape by combination of the first partition 17 and the second partition 19 may divide the storage compartment 20 into three spaces. Among the upper storage compartment 22 and the lower storage compartments 23 and 24 divided by the first partition 17, the upper storage compartment 22 may be used as a refrigerating compartment, and the lower storage compartments 23 and 24 may be used as freezing compartments.

All of the lower storage compartments 23 and 24 may be used as freezing compartments, but the second storage compartment 23 may be used as a freezing compartment and the third storage compartment 24 may be used as a refrigerating compartment, or the second storage compartment 23 may be used as a freezing compartment and the third storage compartment 24 may be used as both a freezing compartment and a refrigerating compartment.

The division of the storage compartment 20 as described above is an example, and each of the storage compartments 22, 23, and 24 may be used differently from the above description.

The storage compartment 20 may be opened and closed by the door 100. The door 100 may include a pair of upper doors 100a and 100b opening and closing the upper storage compartment 22 and a pair of lower doors 100c and 100d opening and closing the lower storage compartments 23 and 24. The pair of upper doors 100a and 100b and the pair of lower doors 100c and 100d may open and close a main body opening 10a of the main body 10 that is open.

One of the pair of upper doors 100a and 100b may be provided with a rotation bar 103. The rotation bar 103 may seal a gap between the pair of upper doors 100a and 100b in a state in which the pair of upper doors 100a and 100b are closed. A rotation bar guide 13 for guiding movement of the rotation bar 103 may be provided on the main body 10.

The upper storage compartment 22 may be opened and closed by the upper doors 100a and 100b rotatably coupled to the main body 10 in which the storage compartment 20 is provided. The upper doors 100a and 100b may be opened and closed through upper door handles (not shown). The upper door handles may be formed as recesses on the lower surfaces of the upper doors 100a and 100b.

Door shelves 105 for storing food may be provided on the rear surfaces (i.e., inner surfaces) of the upper doors 100a and 100b. The door shelves 105 may include shelf support portions 107 vertically extending from the upper doors 100a and 100b to support the door shelves 105 at both left and right sides of the door shelves 105. The shelf support portions 107 may be detachably provided on the upper doors 100a and 100b as a separate structure, and in the embodiment, the shelf support portions 107 are provided to protrude rearward from the rear surfaces of the upper door 100a and 100b and extend in the vertical direction.

First gaskets 109 may be provided at the edges of the rear surfaces of the upper doors 100a and 100b to seal gaps with respect to the main body 10 in a state in which the upper doors 100a and 100b are closed. The first gaskets 109 may be installed in a loop shape along the edges of the rear surfaces of the upper doors 100a and 100b, and may include a first magnet (not shown) inside.

The lower storage compartments 23 and 24, may be opened and closed by lower doors 100c and 100d rotatably coupled to the main body 10 in which the storage compartment 20 is provided. The lower doors 100c and 100d may be opened and closed through lower door handles 104. The lower door handles 104 may be formed as recesses on the upper surfaces of the lower doors 100c and 100d. Although not shown, the lower doors 100c and 100d may be provided in a sliding manner.

Second gaskets 106 may be provided at the edges of the lower doors 100c and 100d to seal the gaps with respect to the main body 10 in a state in which the lower doors 100c and 100d are closed. The second gaskets 106 may be installed in a loop shape along the edges of the rear surfaces of the lower doors 100c and 100d, and may include a second magnet (not shown) inside.

Hereinafter, for the sake of convenience of description, only one door 100 (e.g., the upper left door 100a) will be described, and descriptions of the remaining doors 100 (e.g., the upper right door 100b and the lower doors 100c and 100d) will be omitted. However, the configuration of the upper door 100b, of which the descriptions will be omitted, may be substantially the same as that of the upper door 100a to be described below, except that it is provided in mirror symmetry to the upper door 100a. In addition, the same configuration as that of the upper door 100a may be applied to the lower doors 100c and 100d, and detailed descriptions of the configuration of the lower doors 100c and 100d identical to those of the upper door 100a will be omitted.

Figure 2:
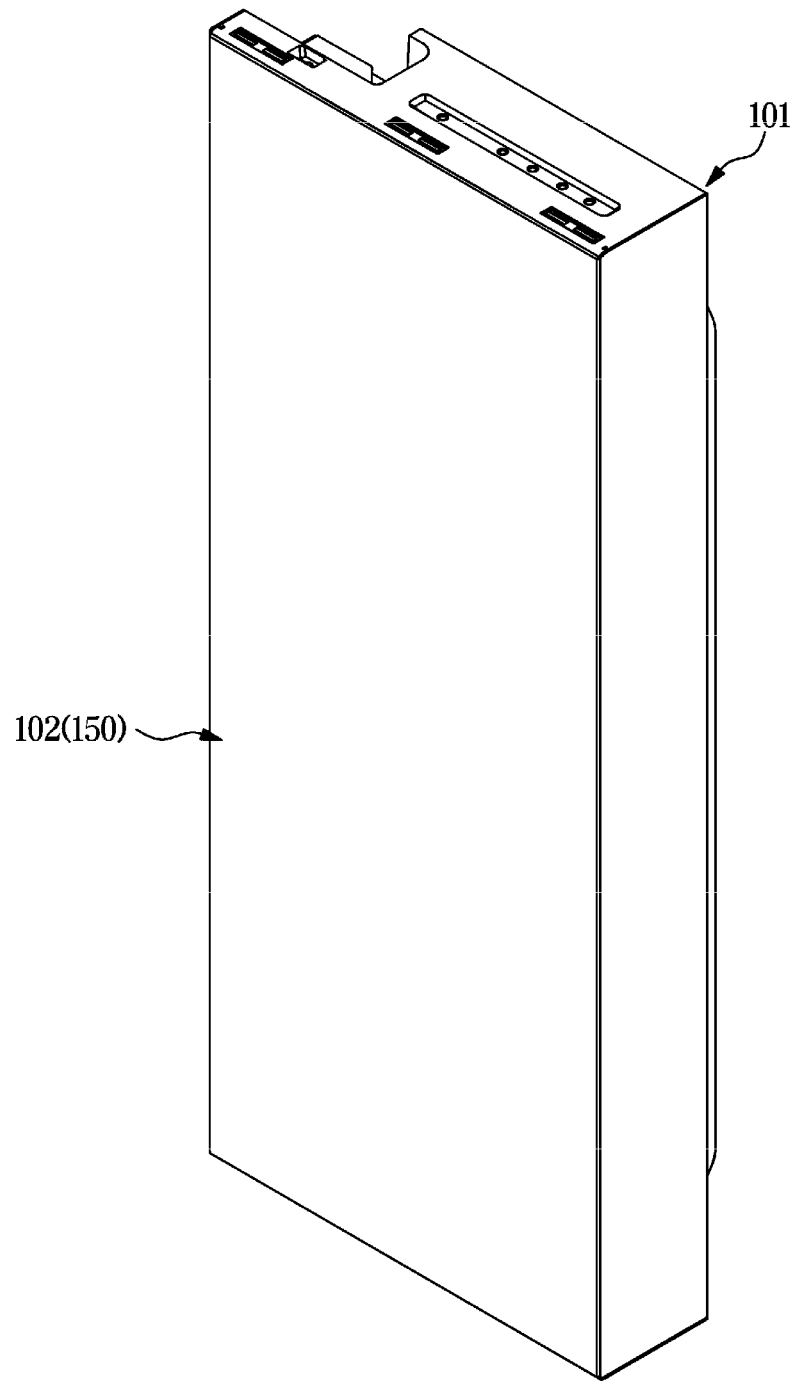
FIG. 2 is a diagram illustrating a door of a refrigerator according to an embodiment of the disclosure.

FIG. 2 is a diagram illustrating a door of a refrigerator according to an embodiment of the disclosure.

Figure 3:
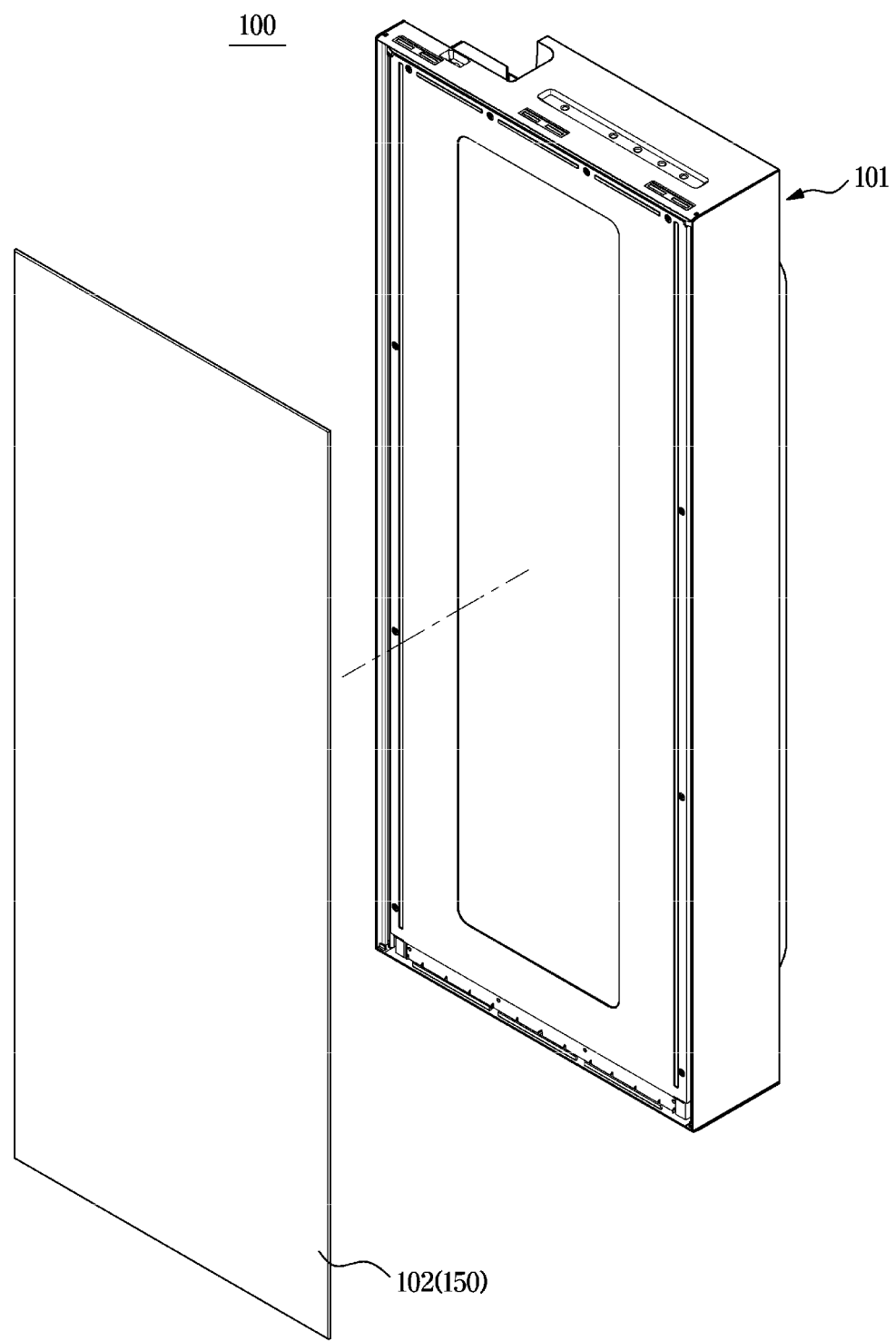
FIG. 3 is a diagram illustrating a door and an electrophoretic display (EPD) panel of a refrigerator according to an embodiment of the disclosure.

FIG. 3 is a diagram illustrating a door and an EPD panel of a refrigerator according to an embodiment of the disclosure.

Figure 4:
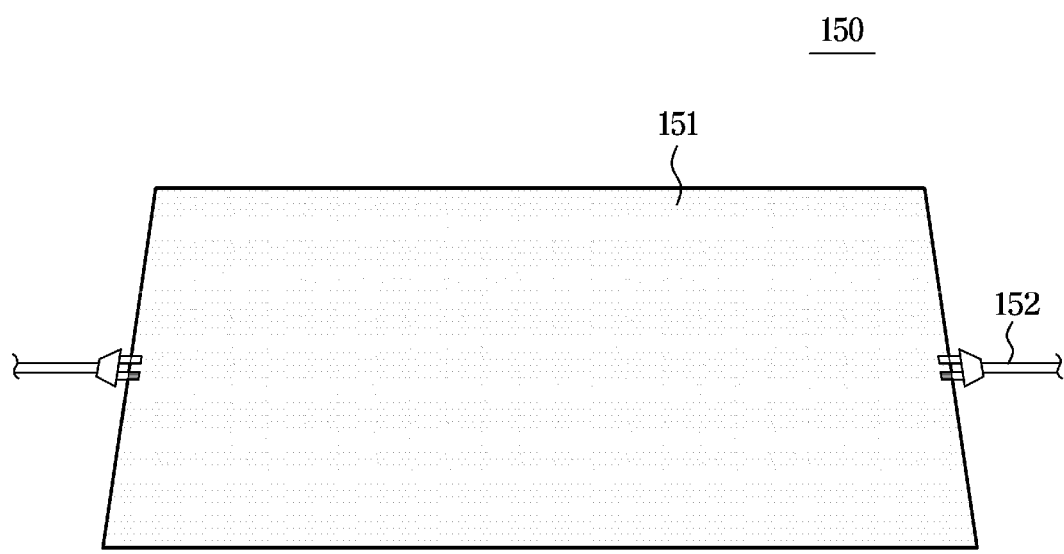
FIG. 4 is a diagram illustrating an external appearance of an EPD panel according to an embodiment of the disclosure.

FIG. 4 is a diagram illustrating an external appearance of an EPD panel according to an embodiment of the disclosure.

Figure 5:
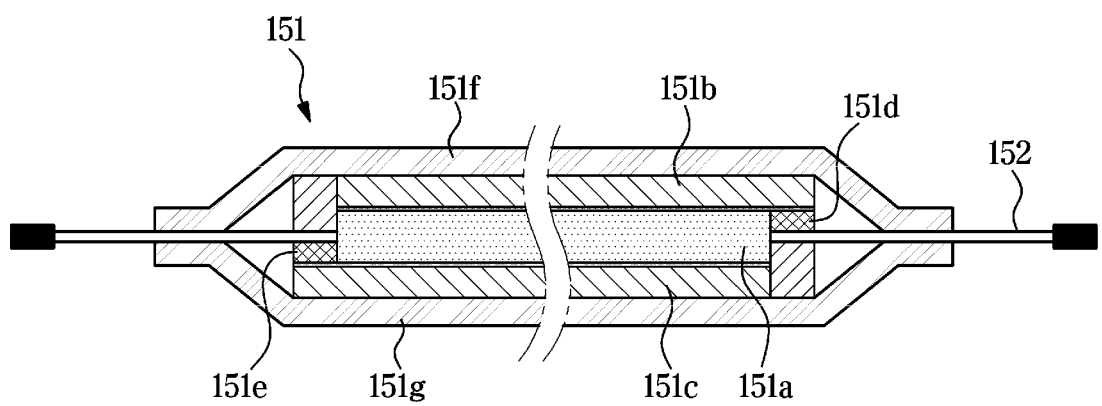
FIG. 5 is a side cross-sectional diagram illustrating an EPD panel according to an embodiment of the disclosure.

FIG. 5 is a side cross-sectional diagram illustrating an EPD panel according to an embodiment of the disclosure.

Referring to FIGS. 2 and 3, the door 100 (e.g., the upper left door 100a) according to an embodiment may include a door body 101 and a door panel 102 located at a front of the door body 101. The door panel 102 may be detachably coupled to the door body 101.

The door panel 102 may be coupled to the door body 101 in various known ways. For example, the door panel 102 includes a first trim (not shown) disposed on a first edge portion of the panel body and provided to be rotatably coupled to the door body 101, and a second trim (not shown) disposed on a second edge portion opposite to the first edge portion of the panel body and provided to be coupled to the door body 101 while the first trim is coupled to the door body 101.

The door panel 102 may form the front exterior of the door 100 and may have a flat plate shape. The door panel 102 may be provided as an EPD panel 150, and may display various designs or colors based on an input of a user or an operating state of the refrigerator 1-1.

Through this, the user may change the external appearance of the refrigerator 1-1 to a desired design or color without physically replacing the door panel 102. In addition, the refrigerator 1-1 may change the exterior design or color based on the operating state, thereby more intuitively notifying the user of the operating state.

Referring to FIGS. 4 and 5, the EPD panel 150 may include a panel body 151 and a connector 152 connecting the panel body 151 to a processor of the refrigerator 1-1.

The panel body 151 may include an activated film 151a (e.g., a front plane laminate (FPL)) having ink capsules, an upper electrode layer 151b provided on an upper side of the activated film 151a, and a lower electrode layer 151c provided on a lower side of the activated film 151a.

In this case, each of the upper electrode layer 151b and the lower electrode layer 151c may be electrically connected to the connector 152 by adhesive members 151d and 151e (e.g., a top plane adhesive (TPA)), and may receive a control command from the processor of the t refrigerator 1-1 connected to the connector 152 through the adhesive members 151d and 151e and the connector 152, and apply electric charges to the ink capsules of the activated film 151a based on a control command. To this end, the electrode layers 151b and 151c may include thin film transistors (TFTs).

The activated film 151a may use small ink capsules containing color particles as pixels, and display an image by changing the arrangement of color particles inside each of the ink capsules based on electric charges transferred from the electrode layers 151b and 151c.

In this case, the color particles of the activated film 151a may be provided as colored particles such that the activated film 151a may display various colors. In addition, according to embodiments, the activated film 151a may include a black light absorption factor and may further include a color filter to form a pixel.

In addition, the panel body 151 may include a protection sheet (PS) 151f provided on an upper side of the upper electrode layer 151b and a protection sheet 151g provided on a lower side of the lower electrode layer 151c.

In addition, the panel body 151 may include a driver integrated chip (IC) (not shown) for controlling the TFTs of the electrode layers 151b and 151c.

As described above, the refrigerator 1-1 of the disclosure may include the door panel 102 provided as the EPD panel 150, and thus the exterior design or color of the refrigerator 1-1 may be easily changed. In addition, since the EPD panel 150 operates on low power and uses electricity only when the contents of pixels change, therefore electricity is not required when displaying a still image continuously, thereby maintaining the energy efficiency of the refrigerator 1-1 at a high level.

Further, since the EPD panel 150 has flexibility and is applicable to the home appliance 1 provided in a curved shape, high visibility may be secured due to having no restriction on the viewing angle.

However, depending on embodiments, the door panel 102 may be provided as other types of display panels than the EPD panel, for example, clearInk, electrowetting display (EWD), a memory liquid crystal display (LCD), an interferometric modulator display (IMOD), and an LCD panel.

Figure 6:
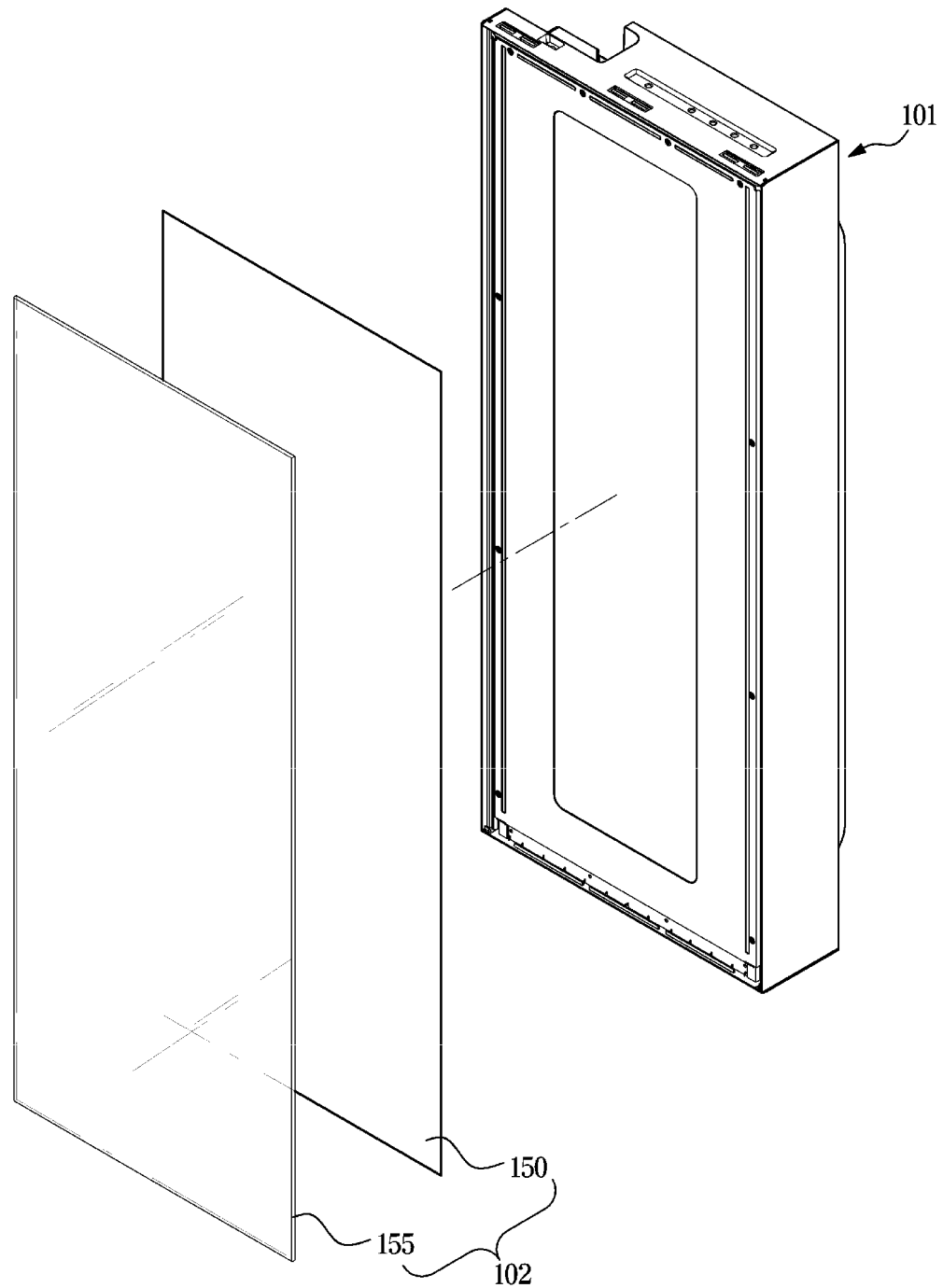
FIG. 6 is a diagram illustrating a case in which a door panel further includes a transparent panel according to an embodiment of the disclosure.

FIG. 6 is a diagram illustrating a case in which a door panel further includes a transparent panel according to an embodiment of the disclosure.

Referring to FIG. 6, the door panel 102 according to an embodiment may further include a transparent panel 155 located at a front of the EPD panel 150.

The transparent panel 155, according to embodiments, may be formed of any one of glass, acrylic, or plastic, and may protect the EPD panel 150 from the outside. When the transparent panel 155 is located at the front of the EPD panel 150, according to embodiments, the EPD panel 150 may not include the protective sheets 151*f* and 151*g* according to embodiments.

The above descriptions concern a form in which the door panel 102 forming the external appearance of the refrigerator 1-1 is provided as the EPD panel 150 for changing display contents. The above description may be equally applied to other types of home appliances 1 than the refrigerator 1-1. Hereinafter, a case in which the home appliance 1 controls the EPD panel 150 to change the exterior design or color thereof based on an input of a user or an operating state will be described in detail.

Figure 7:
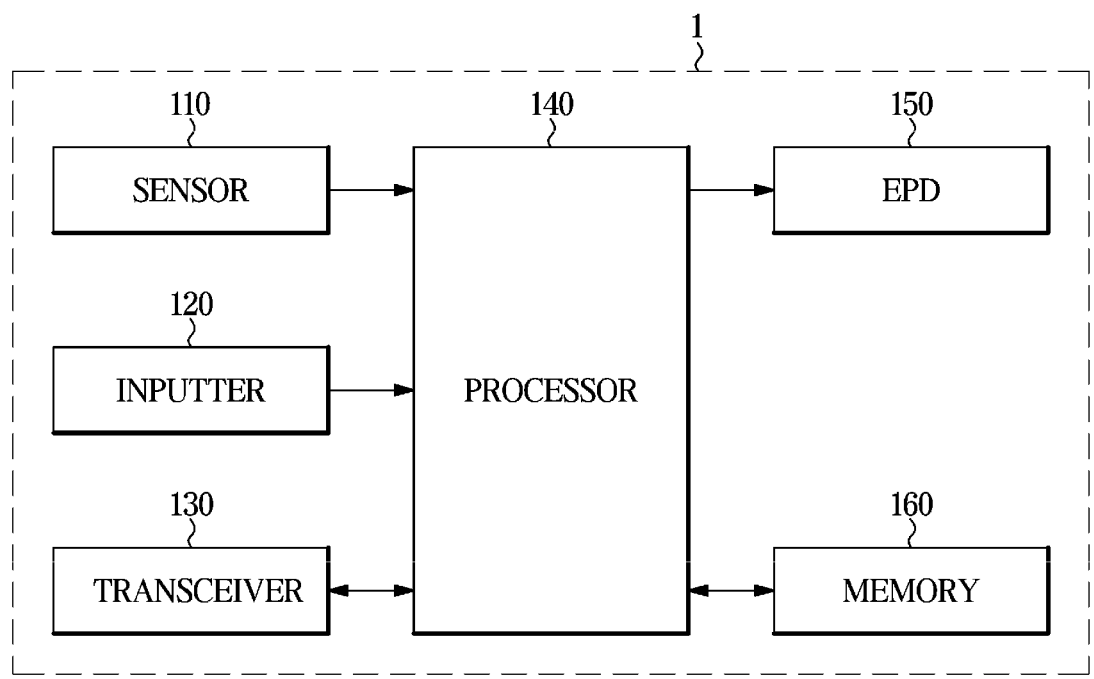
FIG. 7 is a control block diagram illustrating a home appliance according to an embodiment of the disclosure.

FIG. 7 is a control block diagram illustrating a home appliance according to an embodiment of the disclosure.

Referring to FIG. 7, the home appliance 1 according to an embodiment may include a sensor 110 for detecting an operating state, an inputter 120 for receiving an input of a user, a transceiver 130 for communicating with an external electronic device, a processor 140 for controlling an EPD panel 150 based on an input of a user or an operating state, the EPD panel 150 for changing a displayed design or color thereof according to the control of the processor 140, and a memory 160 for storing various types of information required for control.

The sensor 110 according to an embodiment may detect an operating state of the home appliance 1. For example, the sensor 110 corresponds to a temperature sensor and may detect the operating temperature of the home appliance 1. In addition, the sensor 110 may correspond to a gas sensor and may detect whether an odor is generated inside the home appliance 1 (e.g., the refrigerator 1-1). In addition, the sensor 110 may correspond to an image sensor and may detect a change inside the home appliance 1 (e.g., the refrigerator 1-1).

In addition, the sensor 110 may correspond to a fine dust sensor and may detect a concentration of fine dust in a space in which the home appliance 1 is located.

In addition, when the home appliance 1 is a vacuum cleaner, the sensor 110 may correspond to a dust collection container sensor provided in a dust collection container of the vacuum cleaner and detect dust saturation. The dust collection container sensor may be provided as an optical sensor, an image sensor, a pressure sensor, and the like.

The inputter 120 according to an embodiment may be provided on the main body of the home appliance 1 to receive an input from a user. To this end, the inputter 120 may be provided as a known type of input device. For example, the inputter 120 receives a design change command or a color change command from a user. In addition, the inputter 120 may receive input regarding an operating mode or an operating temperature of the home appliance 1.

The transceiver 130 according to an embodiment may communicate with an external electronic device, and to this end, may be provided as a wireless communication module.

The transceiver 130, according to embodiments, may communicate with a user terminal (e.g., a smart phone) to receive a design change command or a color change command being input from the user to the user terminal.

In addition, the transceiver 130, according to embodiments, may communicate with a user terminal to receive a selection command for a color change condition, which is input from the user to the user terminal.

In addition, the transceiver 130, according to embodiments, may communicate with an external server to receive weather information from the server.

The processor 140 according to an embodiment may control the overall operation of the home appliance 1 while controlling the EPD panel 150 to change color based on at least one of a user's selection or an operating state.

That is, the processor 140 may control the EPD panel 150 to display a color corresponding to a user's selection.

In detail, the processor 140, according embodiments, may, upon a color change command being received through the inputter 120, control the EPD panel 150 to change color.

In addition, the processor 140, according to embodiments, may upon a color change command being received from the user terminal through the transceiver 130, control the EPD panel 150 to change color based on the color change command.

In addition, the processor 140 may control a color displayed by the EPD panel 150 based on the operating state of the home appliance 1. In this case, the processor 140, according to an embodiment, may, in consideration of a selection command for a color change condition being input from the user, control the EPD panel 150 to change color based on whether an operating state corresponds to the color change condition associated with the selection command.

For example, the processor 140, in a case of the home appliance 1 corresponding to the refrigerator 1-1, controls the EPD panel 150 to change color based on an operating mode, an operating temperature, or an internal state of the storage compartment 20.

In addition, the processor 140, according to an embodiment, may control the EPD panel 150 to alternately change color when the home appliance 1 fails.

In addition, the processor 140, according to embodiments, may control the EPD panel 150 to change color based on outside weather information.

In addition, the processor 140 may, in a case of the home appliance 1 corresponding to an air conditioner or a cooking appliance, control the EPD panel 150 to change color based on an operating temperature.

In addition, the processor 140 may, in a case of the home appliance 1 corresponding to an air purifier, control the EPD panel 150 to change color based on a filter replacement period or a concentration of fine dust.

In addition, the processor 140 may, in a case of the home appliance 1 corresponding to a vacuum cleaner, control the EPD panel 150 to change color based on the dust saturation of the dust collection container of the vacuum cleaner.

In addition, the processor 140 may, in a case of the home appliance 1 corresponding to any one of a dishwasher, a washing machine, and a laundry care machine, control the EPD panel 150 to change color based on the progress of the operation of the home appliance 1.

The EPD panel 150 according to an embodiment may be located on the outer surface of the main body of the home appliance 1, and variably display the color or design under the control of the processor 140, thereby changing the external design of the home appliance 1.

The memory 160 according to an embodiment may store various types of information required for control, may store an operating mode, an operating temperature, and the like, of the home appliance 1 set by a user, and a correlation between an operating state and a display color.

In the above, components required for controlling the home appliance 1 have been described in detail. Hereinafter, control of the EPD panel 150 located on the outer surface of the home appliance 1 based on an input of a user or an operating state will be described in detail for embodiments.

Figure 8:
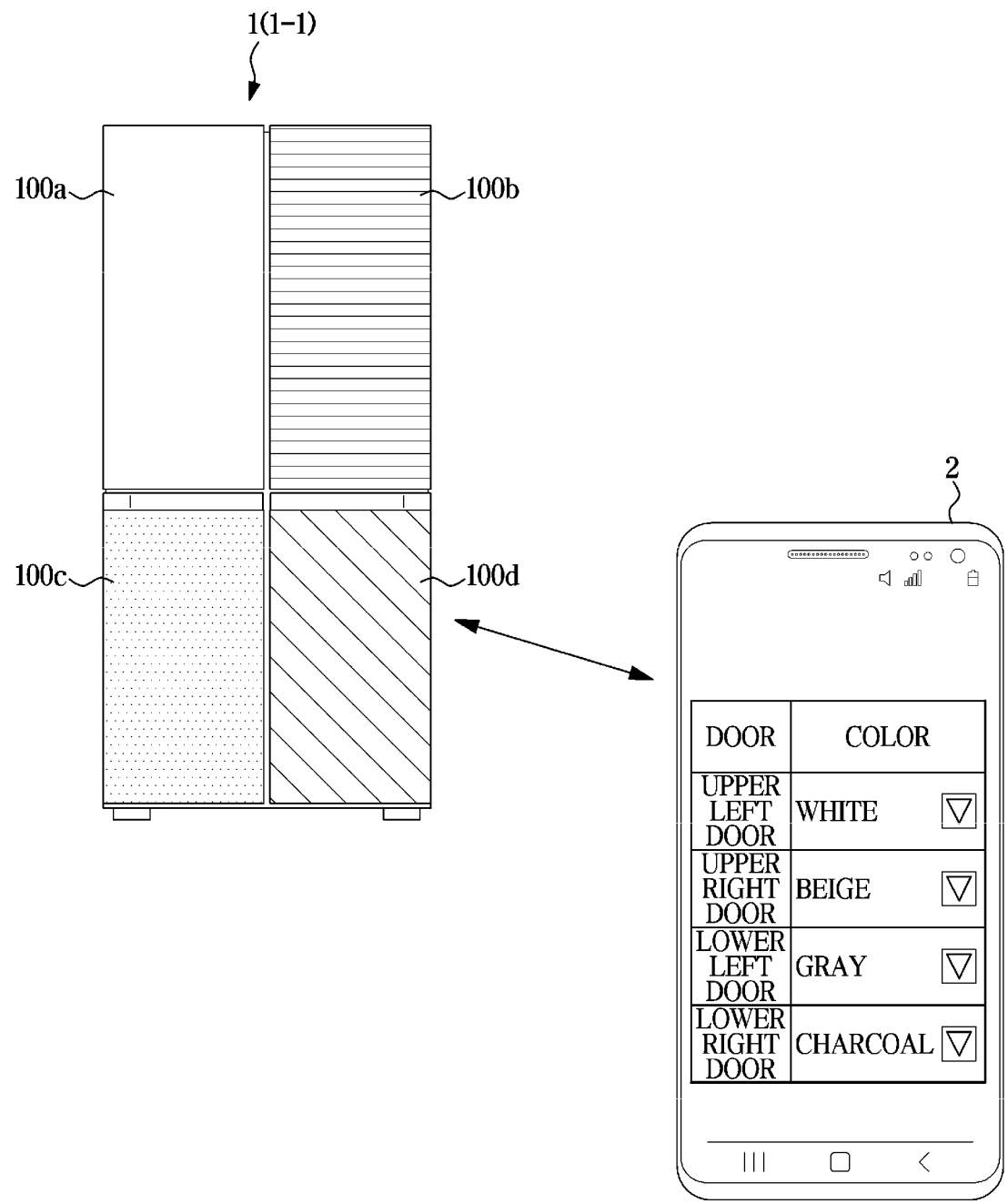
FIG. 8 is a diagram illustrating a case in which a refrigerator changes a color of an EPD panel based on an input of a user according to an embodiment of the disclosure.

FIG. 8 is a diagram illustrating a case in which a refrigerator changes a color of an EPD panel based on an input of a user according to an embodiment of the disclosure.

Referring to FIG. 8, the refrigerator 1-1 according to an embodiment may control the EPD panel 150 to display a color corresponding to a selection by a user.

Referring to FIG. 8, the refrigerator 1-1 may, upon a color change command being received from the user terminal 2 through the transceiver 130, control the EPD panel 150 to change color based on the color change command.

Although not shown in FIG. 8, the refrigerator 1-1 may receive a color change command through the inputter 120 provided in the main body 10, and in this case, may control the EPD panel 150 to change color based on the color change command received through the inputter 120.

The controlling of the EPD panel 150 may include controlling, by the processor 140, the amount of charges supplied to the EPD panel 150, in which the EPD panel 150 may control the amount of charges supplied to the activated film 151*a* based on a control command received through the connector 152.

Specifically, the user may select a product, of which the color is desired to be changed, as the refrigerator 1-1 through the user terminal 2 or the inputter 120, and may select the door 100, of which the color is desired to be changed, and a desired color.

For example, as shown in FIG. 8, when the user selects the color of the upper left door 100*a* as white, selects the color of the upper right door 100*b* as beige, selects the color of the lower left door 100*c* as gray, and selects the color of the lower right door 100*d* as charcoal, the refrigerator 1-1 controls the EPD panel 150 located on the upper left door 100*a* to display a white color, controls the EPD panel 150 located on the upper right door 100*b* to display a beige color, controls the EPD panel 150 located on the lower left door 100*c* to display a gray color, and controls the EPD panel 150 located on the lower right door 100*d* to display a charcoal color.

As described above, the user may change the color or design of the EPD panel 150 located on the outer surface of the refrigerator 1-1 using the inputter 120 or the user terminal 2, thereby easily changing the external appearance of the refrigerator 1-1 with a desired color or desired design without separate panel replacement.

Figure 9:
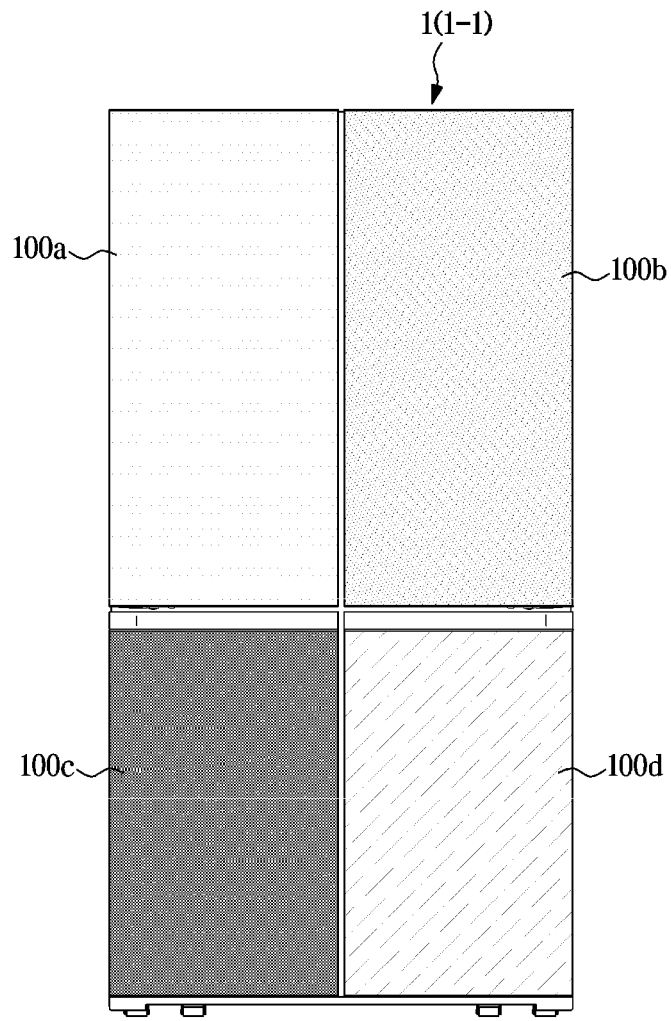
FIG. 9 is a diagram illustrating a case in which a refrigerator changes a color of an EPD panel based on an operating mode according to an embodiment of the disclosure.

FIG. 9 is a diagram illustrating a case in which a refrigerator changes a color of an EPD panel 150 based on an operating mode according to an embodiment of the disclosure.

Figure 10:
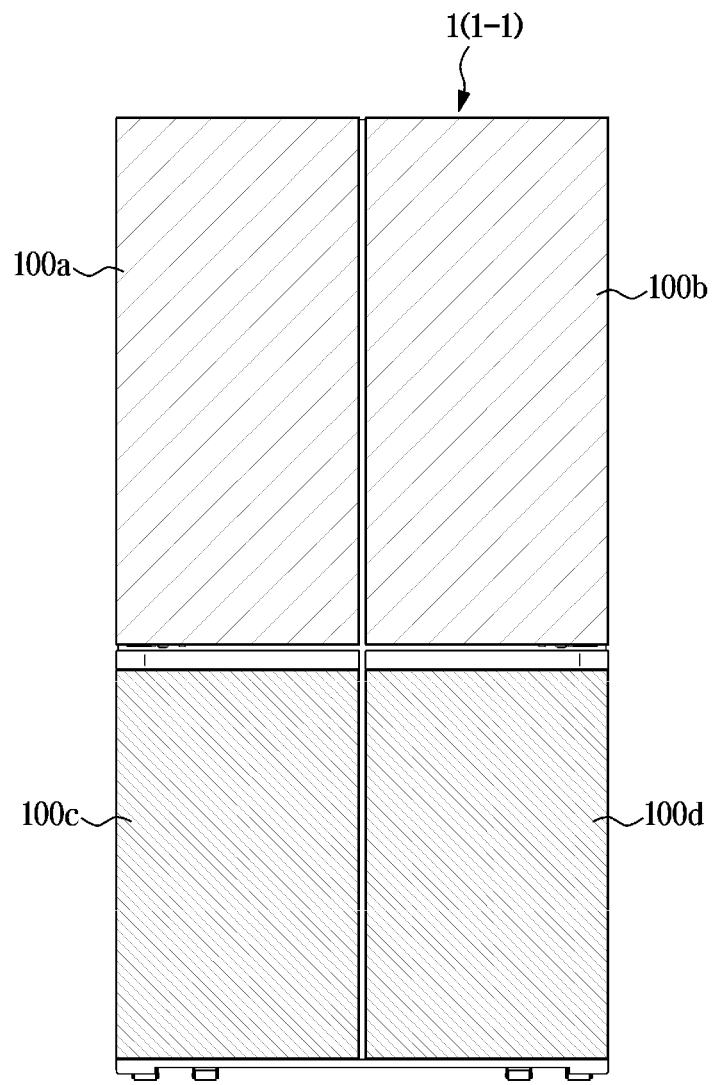
FIG. 10 is a diagram illustrating a case in which a refrigerator changes a color of an EPD panel based on an operating temperature according to an embodiment of the disclosure.

FIG. 10 is a diagram illustrating a case in which a refrigerator changes the color of an EPD panel based on an operating temperature according to an embodiment of the disclosure.

FIG. 11 is a diagram illustrating a case in which a refrigerator changes a color of an EPD panel based on an internal state of a storage compartment according to an embodiment of the disclosure.

Figure 12:
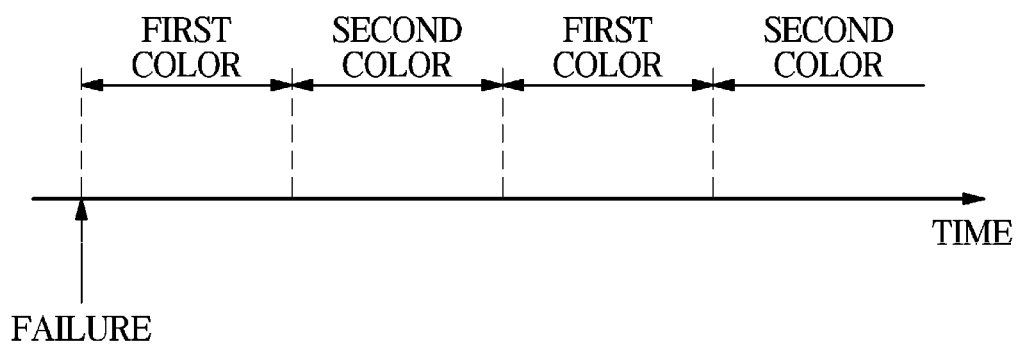
FIG. 12 is a diagram illustrating a case in which a refrigerator controls an EPD panel to alternate colors in a case of failure of the refrigerator according to an embodiment of the disclosure.

FIG. 12 is a diagram illustrating a case in which colors of an EPD panel are controlled to alternate upon malfunction of a refrigerator according to an embodiment of the disclosure, and FIG. 13 is a diagram illustrating a case in which a refrigerator changes a color of an EPD panel based on outside weather information according to an embodiment of the disclosure.

Referring to FIGS. 9 to 13, the refrigerator 1-1 according to an embodiment may control colors displayed by the EPD panel 150 based on an operating state of the refrigerator 1-1 With this, the user may more intuitively recognize the operating state of the refrigerator 1-1.

Referring to FIG. 9, the refrigerator 1-1 may control the EPD panel 150 to change color based on the operating mode of the storage compartment 20.

The user may change the operating mode of the storage compartment 20 through an input through the inputter 120 or the user terminal 2. In addition, according to embodiments, the refrigerator 1-1 may detect the type of food stored in the storage compartment 20 through the sensor 110 (e.g., an image sensor) provided in the storage compartment 20, and change the operating mode of the storage compartment 20 based on the detected type of the stored food.

The operating mode of the storage compartment 20 may be provided by the manufacturer, in which conditions for food storage, such as an operating temperature and an operating humidity suitable for the type of food stored in the storage compartment 20, may be set for each operating mode. For example, the operating mode includes a wine storage mode, a kimchi storage mode, a vegetable storage mode, a meat storage mode, and the like, and the types of operating mode are not limited to the above examples. In addition, the operating mode may be updated from an external server or added.

In this case, the refrigerator 1-1 may control the EPD panel 150 to display a color corresponding to the operating mode of the storage compartment 20 based on the correlation information between the operating mode and the color.

For example, the refrigerator 1-1, upon the storage compartment 20 corresponding to the upper left door 100*a* being changed to the wine storage mode, controls the EPD panel 150 of the upper left door 100*a* to display a purple color corresponding to the wine storage mode. In addition, the refrigerator 1-1 may, upon the storage compartment 20 corresponding to the upper right door 100*b* being changed to the kimchi storage mode, control the EPD panel 150 of the upper right door 100*b* to display a red color corresponding to the kimchi storage mode.

In addition, the refrigerator 1-1 may, upon the storage compartment 24 corresponding to the lower left door 100*c* being changed to the vegetable storage mode, control the EPD panel 150 of the lower left door 100*c* to display a green color corresponding to the vegetable storage mode. In addition, the refrigerator 1-1 may, upon the storage compartment 23 corresponding to the lower right door 100*d* being changed to the meat storage mode, control the EPD panel 150 of the lower right door 100*d* to display a pink color corresponding to the meat storage mode.

Referring to FIG. 10, the refrigerator 1-1 according to an embodiment may control the EPD panel 150 to change color based on the operating temperature of the storage compartment 20.

The user may set the operating temperature for each of the storage compartments 20 through the inputter 120 or the user terminal 2.

In this case, the refrigerator 1-1 may control the EPD panel 150 to display a color corresponding to the operating temperature of the storage compartment 20 based on the correlation information between the operating temperature and the color of the storage compartment 20.

For example, the refrigerator 1-1, upon the upper storage compartment 22 being set at the operating temperature of −5° C. and used as a refrigerating compartment, controls the EPD panels 150 of each of the upper doors 100a and 100b to display a light blue color. In addition, the refrigerator 1-1 may, upon the lower storage compartments 23 and 24 being set to −10° C. and −15° C., respectively, and used as freezing compartments, control the EPD panels 150 of each of the lower doors 100c and 100d to display a blue color.

Referring to FIG. 11, the refrigerator 1-1 according to an embodiment may control the EPD panel 150 to change color based on the internal state of the storage compartment 20.

For example, the refrigerator 1-1 may, upon identifying that an odor has occurred in the storage compartment 20 based on an output of the sensor 110 (e.g., a gas sensor) provided in the storage compartment 20, control the EPD panel 150 to display a black color.

In addition, the refrigerator 1-1 may, upon the food being stored exceeding a capacity of the storage compartment 20 based on an output of the sensor 110 (e.g., an image sensor) provided in the storage compartment 20, control the EPD panel 150 to display a red color.

As described above, the refrigerator 1-1 may, upon identifying that the internal state of the storage compartment 20 is not suitable for storing food, change the color of the EPD panel 150, thereby allowing the user to check the internal state of the storage compartment 20.

Referring to FIG. 12, the refrigerator 1-1 according to an embodiment may control the EPD panel 150 to alternately change color in case of failure.

Specifically, the processor 140 of the refrigerator 1-1 may, upon a current state of the refrigerator 1-1 satisfying a preset failure condition, control the EPD panel 150 to alternately display colors. With this, the user may more intuitively recognize whether the refrigerator 1-1 fails.

For example, as shown in FIG. 12, the refrigerator 1-1 controls the EPD panel 150 to alternately display a first color and a second color when a failure occurs.

Referring to FIG. 13, the refrigerator 1-1 according to an embodiment may control the EPD panel 150 to change color based on outside weather information.

Specifically, the processor 140 may receive outside weather information from an external server through the transceiver 130 and control the EPD panel 150 to display a color corresponding to the received outside weather information. Through this, the refrigerator 1-1 may more intuitively notify the user of outside weather.

For example, the refrigerator 1-1, upon the outside weather information indicating sunny, control the EPD panel 150 to display a sky blue color and upon the outside weather information indicating rain, controls the EPD panel 150 to display a blue color, and upon the outside weather information indicating cloudy, controls the EPD panel 150 to display a gray color, and upon the outside weather information indicating snow, controls the EPD panel 150 to display a white color.

Figure 14:
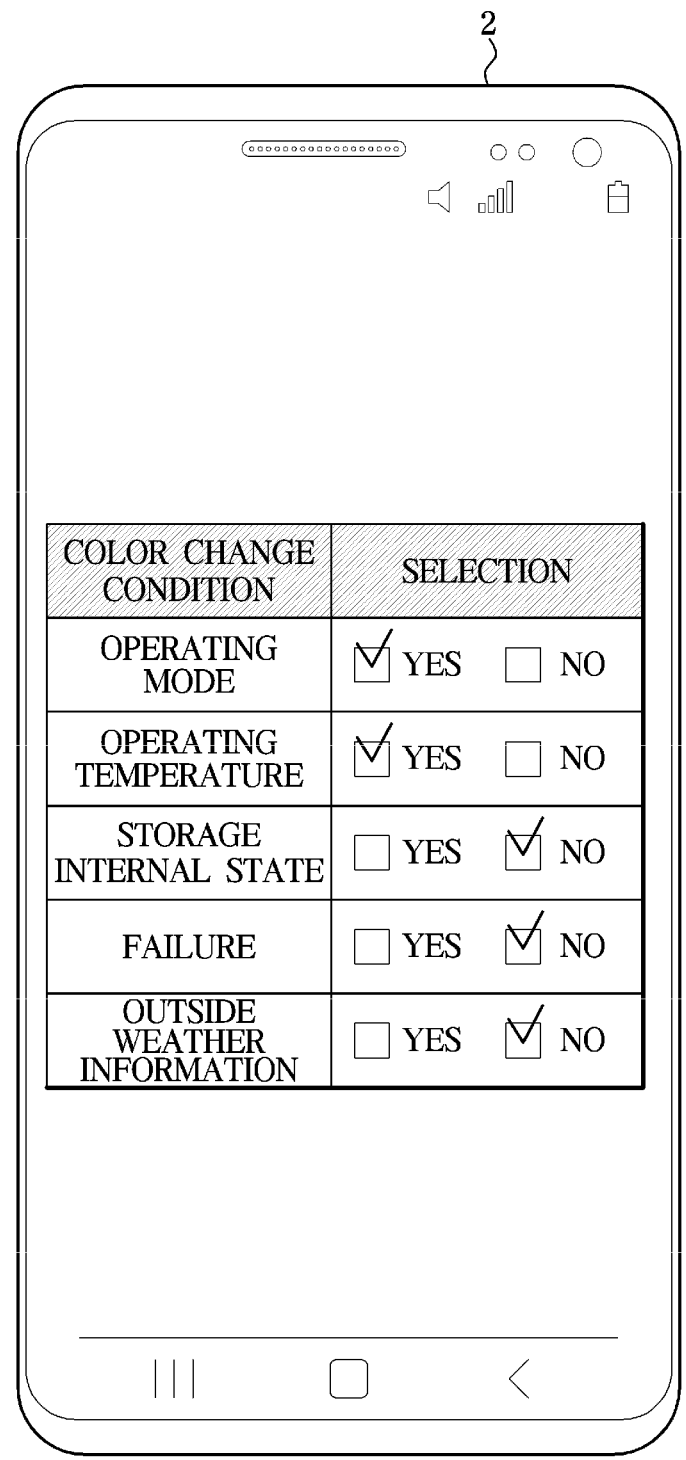
FIG. 14 is a diagram for describing a case in which a refrigerator determines whether to activate a color change condition based on an input of a user according to an embodiment of the disclosure.

FIG. 14 is a diagram for describing a case in which a refrigerator determines activation of a color change condition based on an input of a user according to an embodiment of the disclosure.

Referring to FIG. 14, the refrigerator 1-1 according to an embodiment may receive a selection command for a color change condition from the user through the inputter 120 or the user terminal 2.

Specifically, the user may select whether to activate each of the color change conditions through the inputter 120 or the user terminal 2. For example, as shown in FIG. 14, the user selects an operating mode and an operating temperature as the color change conditions through the user terminal 2, and the user terminal 2 may transmit a selection command for the color change conditions selected by the user to the refrigerator 1-1.

The refrigerator 1-1 according to an embodiment may control the EPD panel 150 to change color based on whether the current operating state corresponds to the color change conditions associated with the selection command.

For example, in response to the operating mode and the operating temperature being selected by the user as color change conditions, the refrigerator 1-1 controls the EPD panel 150 to change color based on the operating mode or the operating temperature.

As described above, since the user may select a color change condition, the user may control the refrigerator 1-1 to change color only based on only an operating state of a desired condition, so that the user may have a color changed to suit his or her taste.

Hereinafter, other home appliances 1 than the refrigerator 1-1 will be described in detail, and the description of the refrigerator 1-1 may be equally applied to the home appliance 1 described below.

Figure 15:
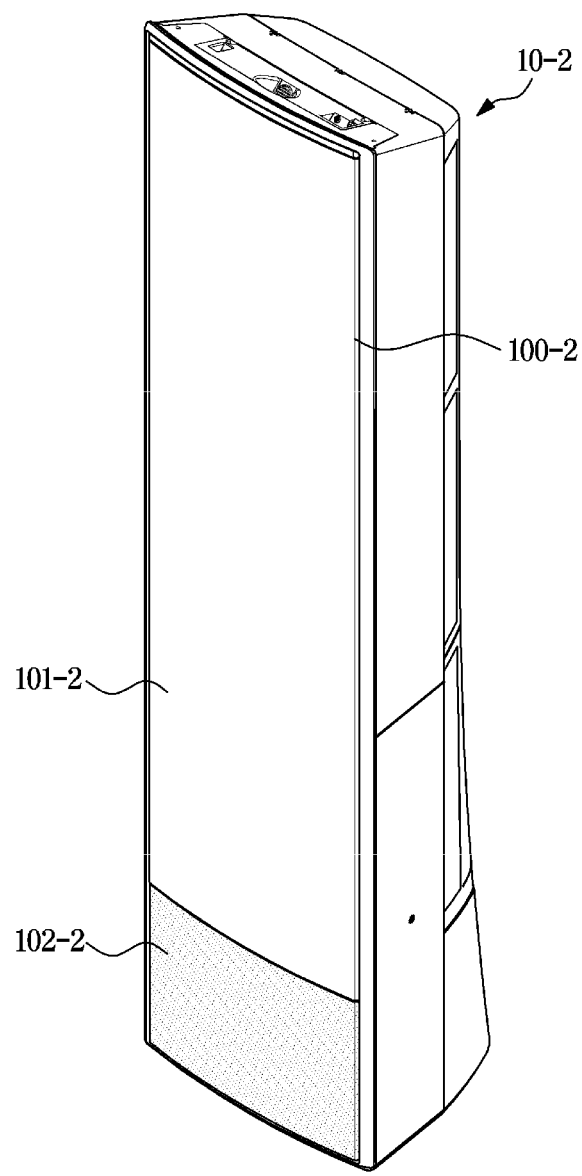
FIG. 15 is a diagram illustrating a case in which an air conditioner changes the color of an EPD display panel based on an operating temperature according to an embodiment of the disclosure.

FIG. 15 is a diagram illustrating a case in which an air conditioner changes the color of an EPD panel based on an operating temperature according to an embodiment of the disclosure.

Referring to FIG. 15, an air conditioner 1-2 according to an embodiment includes a main body 10-2 accommodating a heat exchanger (not shown) performing heat exchange between a refrigerant and indoor air and a blower fan (not shown) blowing indoor air to the heat exchanger, and forming the external appearance of the air conditioner 1-2.

In addition, the main body 10-2 includes a front panel 100-2 covering a front side of the interior in which the heat exchanger and the blowing fan are provided. In this case, the front panel 100-2 includes a discharge panel 101-2 through which air heat-exchanged through the heat exchanger is discharged, and an outer panel 102-2 provided in an area other than the discharge panel 101-2.

In this case, the outer panel 102-2 may be provided as an EPD panel 150, and by changing in the design or color while located on the outer surface of the main body 10-2, change the external design or color of the air conditioner 1-2.

The air conditioner 1-2 may control the EPD panel 150 to change color based on the operating temperature of the air conditioner 1-2.

The user may set the operating temperature of the air conditioner 1-2 through the inputter 120 or the user terminal 2, and the air conditioner 1-2 may control the EPD panel 150 to change color based on the set operating temperature.

For example, as shown in FIG. 15, the air conditioner 1-2, upon the operating temperature being in a range of 28° C. to 30° C., controls the EPD panel 150 to display a white color, and upon the operating temperature being in a range of 24° C. to 28° C., controls the EPD panel 150 to display a sky blue color, and upon the operating temperature being in a range of 18° C. to 24° C., controls the EPD panel 150 to display a blue color.

Through this, the user may more intuitively recognize the operating temperature of the air conditioner 1-2.

Figure 16:
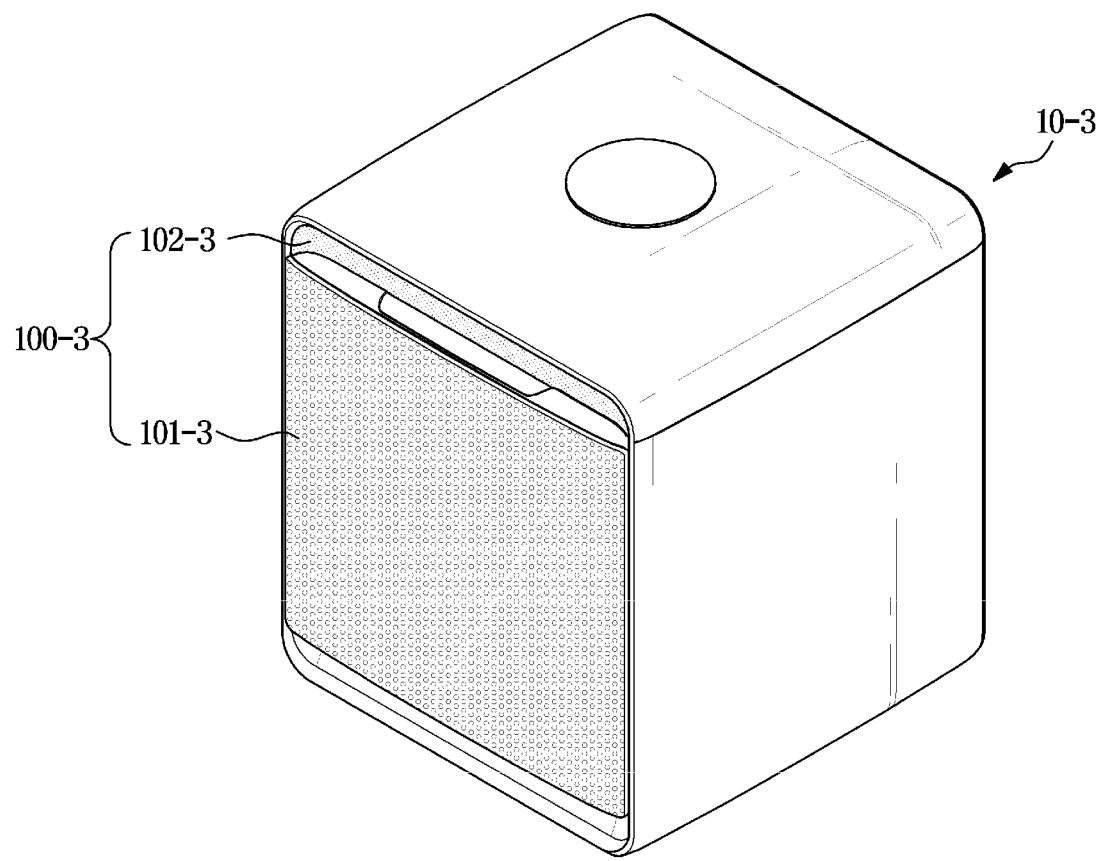
FIG. 16 is a diagram illustrating a case in which an air purifier changes a color of an EPD panel based on a filter replacement period or a concentration of fine dust according to an embodiment of the disclosure.

FIG. 16 is a diagram illustrating a case in which an air purifier changes the color of an EPD panel based on a filter replacement period or a concentration of fine dust according to an embodiment of the disclosure.

Referring to FIG. 16, an air purifier 1-3 according to an embodiment includes a main body 10-3 accommodating a filter (not shown) filtering indoor air and a blowing fan (not shown) blowing indoor air to the filter, and forming the external appearance of the air purifier 1-3.

In addition, the main body 10-3 includes a front panel 100-3 covering a front surface of the interior in which the filter and the blowing fan are provided. In this case, the front panel 100-3 includes a discharge panel 101-3 through which air filtered through the filter is discharged, and an outer panel 102-3 provided in an area other than the discharge panel 101-3.

In this case, the outer panel 102-3 may be provided as an EPD panel 150, and by changing in the design or color while located on the outer surface of the main body 10-3, change the external design or color of the air purifier 1-3.

The air purifier 1-3 may control the EPD panel 150 to change color based on the concentration of fine dust in the indoor area or the filter replacement period.

Specifically, the processor 140 of the air purifier 1-3 may control the EPD panel 150 to display a darker color as the concentration of fine dust increases based on the output of the sensor 110 (e.g., the fine dust sensor).

For example, the air purifier 1-3 controls the EPD panel 150 to display a white color when the fine dust concentration is low, display a beige color when the fine dust concentration is intermediate, and display an orange color when the fine dust concentration is high.

In addition, the processor 140 of the air purifier 1-3 may control the EPD panel 150 to display a darker color as the filter replacement period is imminent, based on the filter replacement period. In this case, the air purifier 1-3 may determine whether the filter replacement period is imminent based on a preset time elapsing since a filter is replaced, or may determine whether the filter replacement period is imminent based on an output of the sensor 110 (e.g., the contamination detection sensor).

For example, the air purifier 1-3 may control the EPD panel 150 to display a white color in response to a large amount of time being left to the filter replacement period, display a beige color in response to half time being left to the filter replacement period, and display an orange color in response to a small amount of time being left to the filter replacement period.

Through this, the user may more intuitively recognize the filter replacement period of the air purifier 1-2 or the concentration of fine dust in the indoor air.

Figure 17:
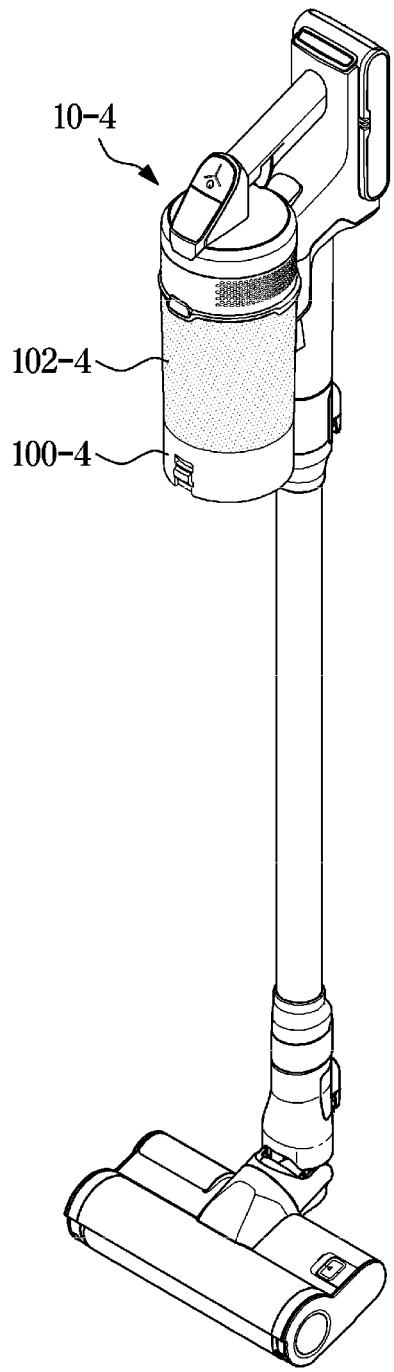
FIG. 17 is a diagram illustrating a case in which a vacuum cleaner changes a color of an EPD panel based on a dust saturation in a dust collection container according to an embodiment of the disclosure.

FIG. 17 is a diagram illustrating a case in which a vacuum cleaner changes a color of an EPD panel based on the saturation of dust in a dust collection container according to an embodiment of the disclosure.

Referring to FIG. 17, a vacuum cleaner 1-4 according to an embodiment includes a main body 10-4 accommodating a suction motor suctioning dust and forming the external appearance of the vacuum cleaner 1-4.

In this case, the main body 10-4 includes a dust collection container 100-4 collecting the suctioned dust, and an outer panel 102-4 may be disposed on the outer surface of the dust collection container 100-4.

In this case, the outer panel 102-3 may be provided as an EPD panel 150, and by changing in the design or color while located on the outer surface of the main body 10, change the external design or color of the vacuum cleaner 1-4.

The vacuum cleaner 1-4 may control the EPD panel 150 to change color based on the dust saturation of the dust collection container 100-4.

Specifically, the vacuum cleaner 1-4 may control the EPD panel 150 to display a darker color as the dust saturation increases, thereby preventing a large amount of dust from being visible from the outside, and preventing aversion caused by dust.

For example, the vacuum cleaner 1-4 may control the EPD panel 150 to display a white color upon the dust saturation being less than 30%, display a gray color upon the dust saturation being greater than or equal to 30% and less than 80%, and display a black color upon the dust saturation being greater than or equal to 80%.

Figure 18:
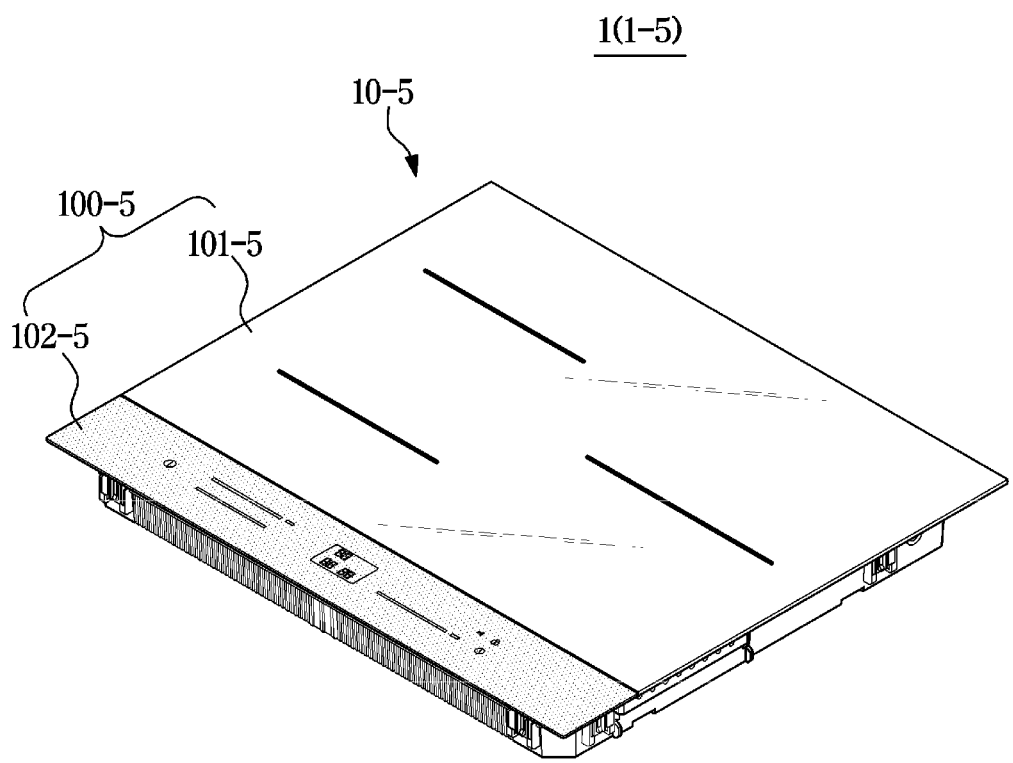
FIG. 18 is a diagram illustrating a case in which a cooking appliance changes the color of an EPD panel based on an operating temperature according to an embodiment of the disclosure.

FIG. 18 is a diagram illustrating a case in which a cooking appliance changes a color of an EPD panel based on an operating temperature according to an embodiment of the disclosure.

Referring to FIG. 18, a cooking appliance 1-5 according to an embodiment includes a main body 10-5 accommodating a heat source for heating food, and forming the external appearance of the cooking appliance 1-5.

In addition, the main body 10-5 includes a front panel 100-5 covering a front surface of the interior in which the heat source is provided. In this case, the front panel 100-5 includes a heating panel 101-5 provided at a position corresponding to the heat source to heat food, and an outer panel 102-5 provided in an area other than the heating panel 101-5.

In this case, the outer panel 102-5 may be provided as an EPD panel 150, and by changing in the design or color while located on the outer surface of the main body 10-5, change the external design or color of the cooking appliance 1-5.

The cooking appliance 1-5 may control the EPD panel 150 to change color based on the operating temperature of the cooking appliance 1-5.

Specifically, the cooking appliance 1-5 may control the EPD panel 150 to display a darker color as the operating temperature increases according to the heating operation.

For example, as shown in FIG. 15, the cooking appliances 1-5 may control the EPD panel 150 to display a white color upon the operating temperature being in a range of 50° C. and 70° C., control the EPD panel 150 to display a bright red color upon the operating temperature being in a range of 70° C. and 100° C., and control the EPD panel 150 to display a red color upon the operating temperature being higher than or equal to 100° C.

Through this, the user may more intuitively recognize the operating temperature of the cooking appliance 1-5. In addition, even in a state in which food is removed after cooking, since the color of the EPD panel 150 may be controlled based on the temperature of the cooking appliance 1-5, the risk of a user having a burn may be prevented.

Figure 19:
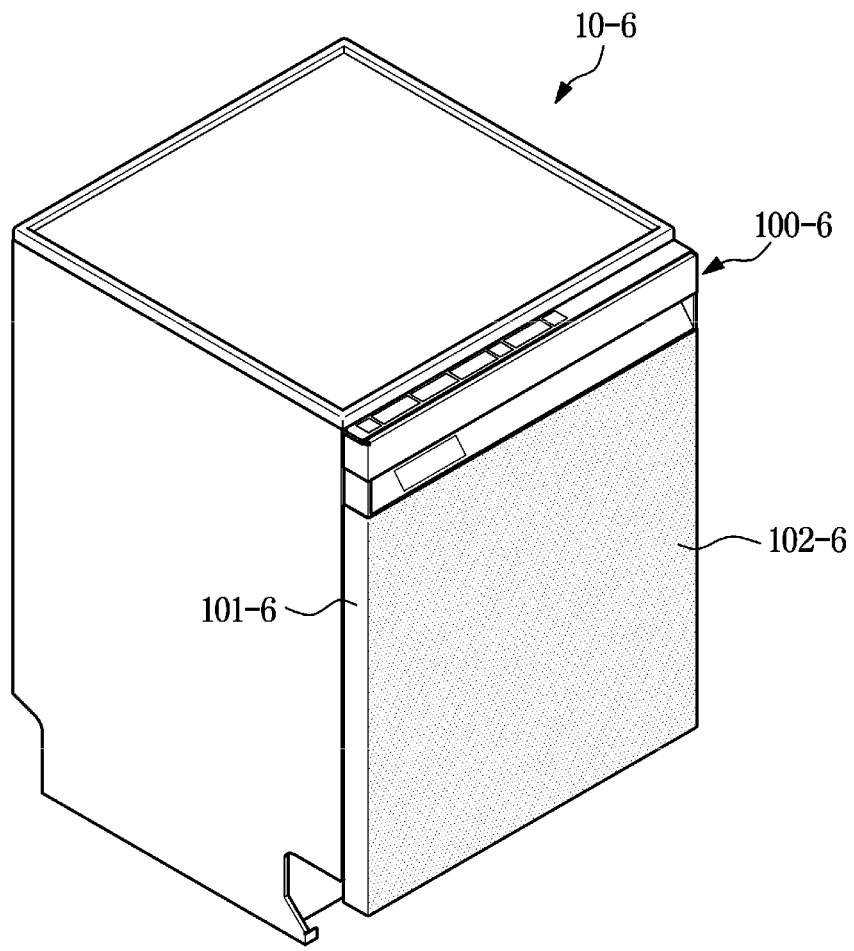
FIG. 19 is a diagram illustrating a case in which a dishwasher changes a color of an EPD panel based on the progress of operation according to an embodiment of the disclosure.

FIG. 19 is a diagram illustrating a case in which a dishwasher changes a color of an EPD panel 150 based on the progress of the operation according to an embodiment of the disclosure.

Referring to FIG. 19, a dishwasher 1-6 according to an embodiment includes a main body 10-6 having a washing chamber (not shown) formed therein and forming an external appearance.

In addition, the main body 10-6 may include a door 100-6 provided to open and close the washing chamber, and the door 100-6 may include a door body 101-6 and a door panel 102-6 located at a front of the door body 101-6.

In this case, the door panel 102-6 may be provided as an EPD panel 150, and by changing in the design or color while located on the outer surface of the main body 10-6, change the external design or color of the dishwasher 1-6.

Specifically, the dishwasher 1-6 may control the EPD panel 150 to change color according to the progress of a washing cycle.

For example, the dishwashers 1-6 may control the EPD panel 150 to display a white color in an off-state, display a purple color while the washing cycle is in progress, and display a green color when the washing cycle is completed.

As described above, since the dishwasher 1-6 may change the color of the EPD panel 150 according to the progress of the operation, the user may intuitively identify the progress of the washing cycle of the dishwasher 1-6

Figure 20:
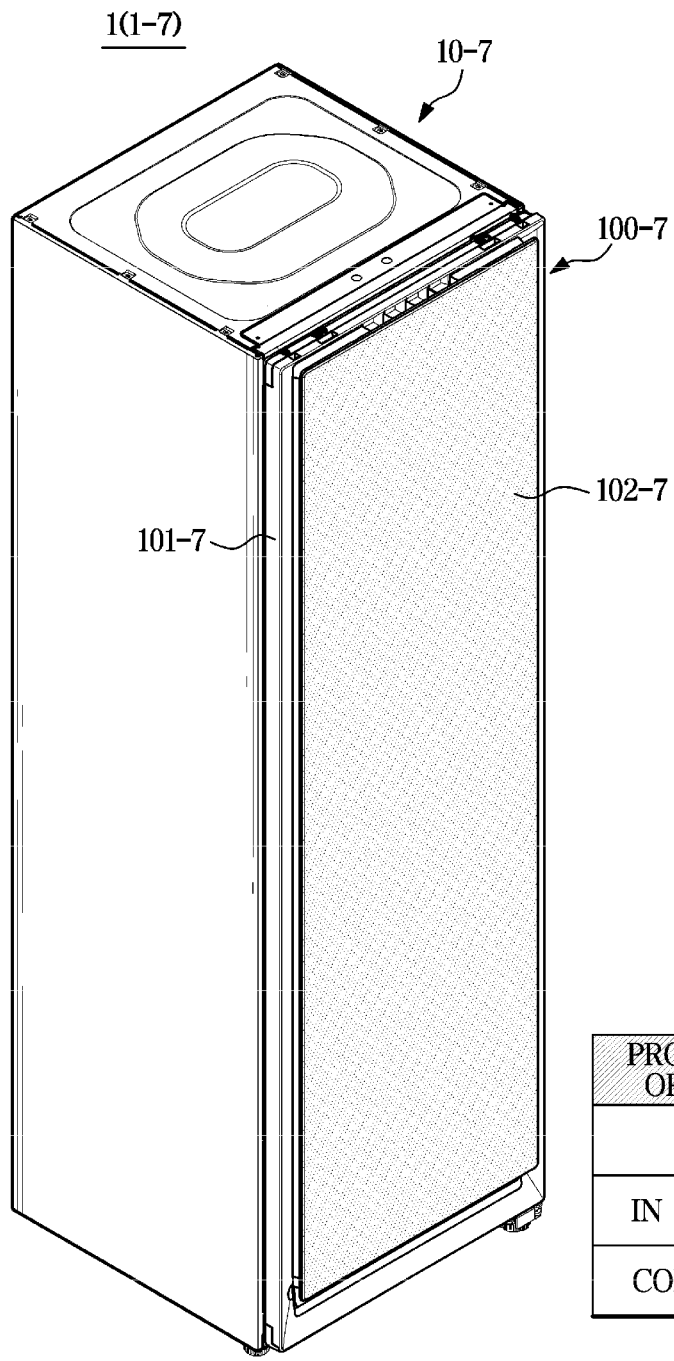
FIG. 20 is a diagram illustrating a case in which a clothes care device changes a color of an EPD panel based on the progress of operation according to an embodiment of the disclosure.

FIG. 20 is a diagram illustrating a case in which a clothes care device changes a color of an EPD panel based on the progress of the operation according to an embodiment of the disclosure.

Referring to FIG. 20, a clothes care device 1-7 according to an embodiment includes a main body 10-7 having a clothes care compartment (not shown) formed inside and forming the external appearance of the clothes care device 1-7.

In addition, the main body 10-7 may include a clothes support member (not shown) provided inside the clothes care compartment to hold clothes and a machine room (not shown) accommodating a heat exchanging device (not shown) provided to dehumidify or heat the air inside the clothes care compartment.

In addition, the main body 10-7 may include a door 100-7 provided to open and close the clothes care compartment, and the door 100-7 may include a door body 101-7 and a door panel 102-7 located at a front of the door body 101-7.

In this case, the door panel 102-7 may be provided as an EPD panel 150, and by changing in the design or color while located on the outer surface of the main body 10-6, change the external design or color of the clothes care device 1-7.

Specifically, the clothes care device 1-7 may control the EPD panel 150 to change color according to the progress of the clothes care cycle.

For example, the clothes care device 1-7 may display the EPD panel 150 to display a white color in an off-state, display a purple color while the clothes care cycle is in progress, and display a green color when the clothes care cycle is completed.

As described above, since the clothes care device 1-7 changes the color of the EPD panel 150 according to the progress of the operation, the user may intuitively identify the progress of the clothes care cycle of the clothes care device 1-7.

Figure 21:
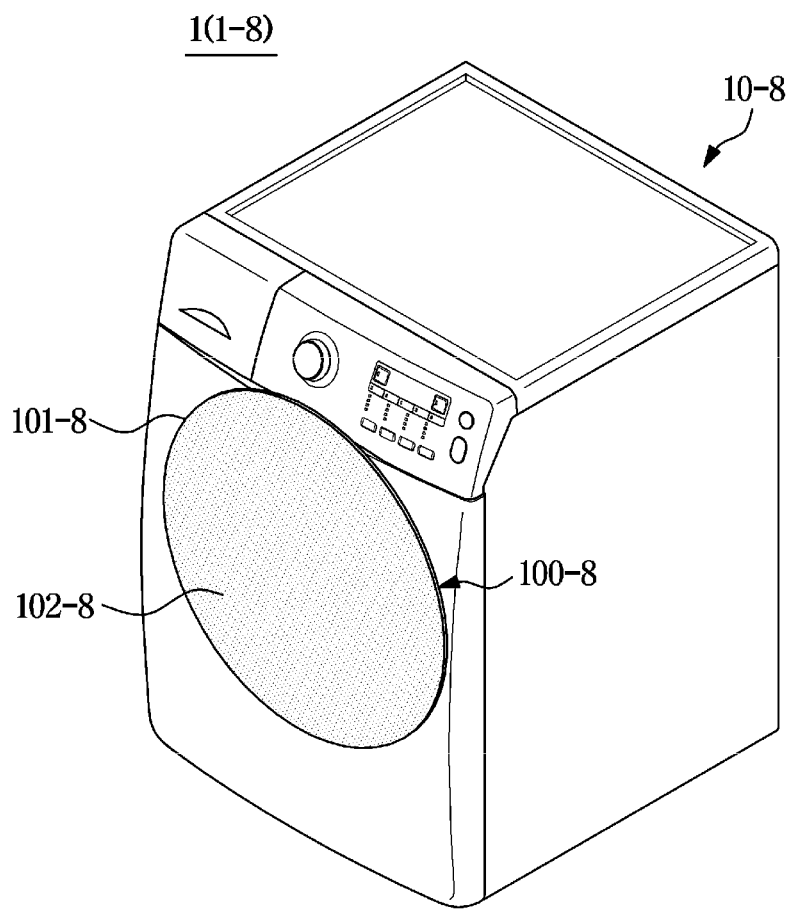
FIG. 21 is a diagram illustrating a case in which a washing machine changes a color of an EPD panel based on the progress of operation according to an embodiment of the disclosure.

FIG. 21 is a diagram illustrating a case in which a washing machine changes a color of an EPD panel based on the progress of the operation according to an embodiment of the disclosure.

Referring to FIG. 21, a washing machine 1-8 according to an embodiment includes a main body 10-8 that has a tub (not shown) formed therein to accommodate laundry and forms an external appearance of the washing machine 1-8.

In addition, the main body 10-8 may include a door 100-8 provided to open and close the tub, and the door 100-8 includes a door body 101-8 and a door panel 102-8 located at a front of the door body 101-8.

In this case, the door panel 102-8 may be provided as an EPD panel 150, and by change in the design or color while located on the outer surface of the main body 10-8, change the external design and color of the washing machine 1-8.

Specifically, the washing machine 1-8 may control the EPD panel 150 to change color according to the progress of the washing cycle.

For example, the washing machine 1-8 controls the EPD panel 150 to display a white color in an off-state, display a sky blue color while the washing cycle is in progress, and display a blue color when the washing cycle is completed.

As described above, since the washing machine 1-8 may change the color of the EPD panel 150 according to the progress of the operation, the user may intuitively identify the progress of the washing cycle of the washing machine 1-8.

Hereinafter, an embodiment of a method of controlling a home appliance 1 according to an aspect will be described. The method of controlling the home appliance 1 may employ the home appliance 1 according to the above-described embodiment. Therefore, details described above with reference to FIGS. 1 to 21 may be equally applied to the method of controlling the home appliance 1.

Figure 22:
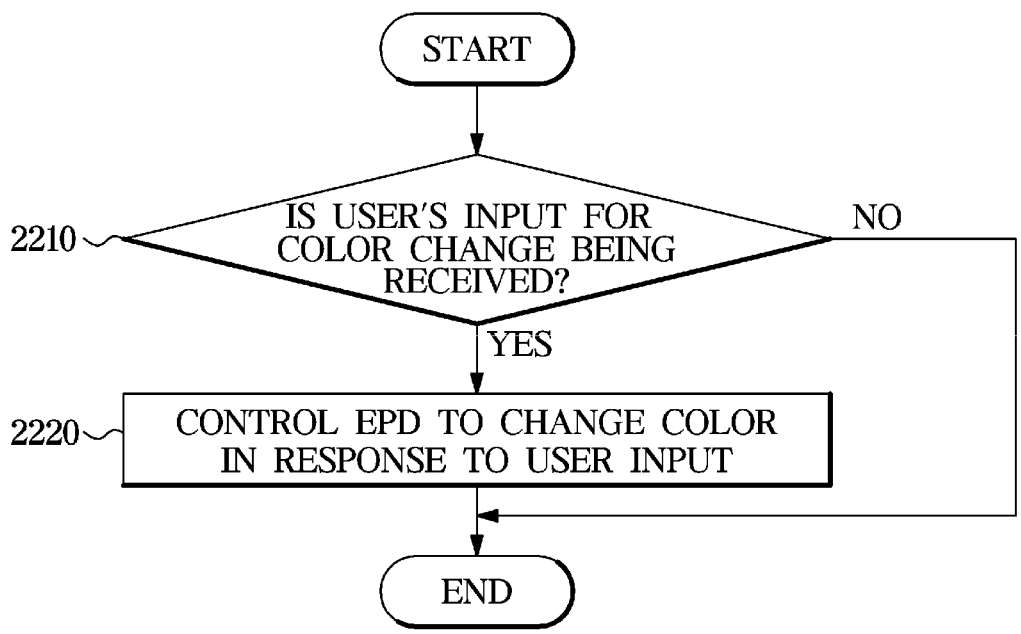
FIG. 22 is a flowchart showing a method of controlling a home appliance, which shows a case of changing a color of an EPD based on input of a user according to an embodiment of the disclosure.

FIG. 22 is a flowchart showing a case of changing a color of an EPD panel based on an input of a user in a method of controlling a home appliance according to an embodiment of the disclosure.

Referring to FIG. 22, the home appliance 1 according to an embodiment may, upon an input of a user for changing a color (YES in operation 2210), control the EPD panel 150 to change a color in response to the input of the user (2220).

That is, the processor 140 may control the EPD panel 150 to display a color corresponding to a selection by a user.

In detail, the processor 140, according to embodiments, may, upon a color change command being received through the inputter 120, control the EPD panel 150 to change color based on the color change command.

In addition, the processor 140, according to embodiments, may, upon a color change command being received from the user terminal through the transceiver 130, control the EPD panel 150 to change color based on the color change command.

As described above, since the user may change the color or design of the EPD panel 150 located on the outer surface of the home appliance 1 using the inputter 120 or the user terminal 2, the external appearance of the home appliance 1 may be easily changed with a desired color or design without a separate panel replacement.

FIG. 23 is a flowchart showing a case of changing a color of an EPD panel based on an operating state in a method of controlling a home appliance according to an embodiment of the disclosure.

Referring to FIG. 23, the home appliance 1 according to an embodiment may receive a selection command for a color change condition (YES in operation 2310), and upon an operating state corresponds to the color change condition associated with the selection command (YES in operation 2320), control the EPD panel 150 to change color based on the operating state (2330).

That is, the processor 140 may control a color displayed on the EPD panel 150 based on the operating state of the home appliance 1. In this case, the processor 140, according to embodiments, may, in consideration of a selection command for a color change condition input from the user, control the EPD panel 150 to change color based on whether the operating state corresponds to the color change condition associated with the selection command.

For example, the processor 140 may, in a case of the home appliance 1 corresponding to the refrigerator 1-1, control the EPD panel 150 to change color based on an operating mode, an operating temperature, or an internal state of the storage compartment 20.

In addition, the processor 140, according to an embodiment, may control the EPD panel 150 to alternately change color when the home appliance 1 fails, In addition, the processor 140, according to embodiments, may control the EPD panel 150 to change color based on outside weather information.

In addition, the processor 140 may, in a case of the home appliance 1 corresponding to an air conditioner or a cooking appliance, control the EPD panel 150 to change color based on an operating temperature.

In addition, the processor 140 may, in a case of the home appliance 1 corresponding to an air purifier, control the EPD panel 150 to change color based on the filter replacement period or the concentration of fine dust.

In addition, the processor 140 may, in a case of the home appliance 1 corresponding to a vacuum cleaner, control the EPD panel 150 to change color based on the dust saturation of the dust collection container of the vacuum cleaner.

In addition, the processor 140 may, in a case of the home appliance 1 corresponding to any one of a dishwasher, a washing machine, and a clothes care device, control the EPD panel 150 to change color based on the progress of the operation of the home appliance 1.

As described above, since the home appliance 1 may change the color or design of the EPD panel 150 located on the outer surface of the home appliance 1 based on the operating state, the user may be more intuitively notified of the operating state of the home appliance 1.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A refrigerator comprising:
    a first door for opening and closing a first storage compartment;
    a second door for opening and closing a second storage compartment;
    a first door panel forming a front surface of the first door and including a first display panel;
    a second door panel forming a front surface of the second door and including a second display panel;
    a sensor configured to detect an operating state of the refrigerator;
    a transceiver configured to communicate with an external device; and
    a processor configured to control the first display panel and the second display panel,
    wherein the processor is further configured to:
        obtain information about a first color to be displayed on the first door through the transceiver and control the first display panel so that the first door is displayed in the first color,
        obtain information about a second color to be displayed on the second door through the transceiver and control the second display panel so that the second door is displayed in the second color,
        obtain a color change condition for changing at least one of the first color of the first door or the second color of the second door through the transceiver, the color change condition being related to the sensor detecting an abnormality in one of the operating state of the refrigerator, the first storage compartment, or the second storage compartment, and
        control at least one of the first display panel or the second display panel to inform the operating state of the refrigerator based on the operating state of the refrigerator and the color change condition.

2. The refrigerator of claim 1, wherein the processor is further configured to:
    control the first display panel and the second display panel so that the first door and the second door display different colors.

3. The refrigerator of claim 1, wherein the processor is further configured to:
    control at least one of the first display panel or the second display panel to inform the operating state of the refrigerator by periodically alternating a color of the at least one of the first door or the second door.

4. The refrigerator of claim 1,
    wherein the first storage compartment includes a freezer compartment, and
    wherein the second storage compartment includes a refrigerator compartment.

5. The refrigerator of claim 4, further comprising:
    a transparent panel disposed in front of each of the first display panel and the second display panel.

6. The refrigerator of claim 1, wherein the first storage compartment and the first door are located above the second storage compartment and the second door.

7. The refrigerator of claim 1,
    wherein the operating state of the refrigerator includes an internal state of each of the first storage compartment and the second storage compartment, and
    wherein the sensor is further configured to detect the internal state of each of the first storage compartment and the second storage compartment.

8. The refrigerator of claim 1, further comprising:
    memory storing the information about the first color, the information about the second color, and the color change condition.

9. The refrigerator of claim 1, wherein the color change condition includes at least one color change condition selected to be activated among a plurality of color change conditions.

10. The refrigerator of claim 1, wherein the processor is further configured to:
    obtain a user input through the transceiver to activate at least one of a plurality of color change conditions including the operating state of the refrigerator and external information,
    control at least one of the first display panel or the second display panel to change at least one of the first color of the first door or the second color of the second door based on at least one activated color change condition,
    based on the at least one activated color change condition including the external information, control at least one of the first display panel or the second display panel so that a color corresponding to the external information is displayed on at least one of the first door or the second door.

11. The refrigerator of claim 1, wherein the processor is further configured to:

change an appearance of at least one of the first display panel or the second display panel to inform the operating state of the refrigerator.

12. The refrigerator of claim 11, wherein the processor is further configured to:
change a color of at least one of the first display panel or the second display panel to inform the operating state of the refrigerator.

13. The refrigerator of claim 11, wherein the operating state includes a preset failure condition.

14. A method of controlling a refrigerator including a first door for opening and closing a first storage compartment and being equipped with a first display panel, a second door for opening and closing a second storage compartment and being equipped with a second display panel, a sensor configured to detect an operating state of the refrigerator, and a transceiver configured to communicate with an external device, the method comprising:
obtaining, through the transceiver, information about a first color to be displayed on the first door and controlling the first display panel so that the first door is displayed in the first color;
obtaining, through the transceiver, information about a second color to be displayed on the second door and controlling the second display panel so that the second door is displayed in the second color;
obtaining, through the transceiver, a color change condition for changing at least one of the first color of the first door or the second color of the second door, the color change condition being related to the sensor detecting an abnormality in one of the operating state of the refrigerator, the first storage compartment, or the second storage compartment; and
controlling at least one of the first display panel or the second display panel to inform the operating state of the refrigerator based on the operating state of the refrigerator and the color change condition.

15. The method of claim 14, wherein the operating state of the refrigerator is informed by periodically alternating an appearance of the at least one of the first door or the second door.

16. The method of claim 14, wherein the first display panel and the second display panel are controlled so that the first door and the second door display different colors.

17. The method of claim 14, wherein the controlling of the at least one of the first display panel or the second display panel comprises:
changing an appearance of at least one of the first display panel or the second display panel to inform the operating state of the refrigerator.

18. The method of claim 17, wherein the changing of the appearance of at least one of the first display panel or the second display panel comprises:
changing a color of at least one of the first display panel or the second display panel to inform the operating state of the refrigerator.

19. The method of claim 17, wherein the operating state includes a preset failure condition.

20. The method of claim 15, wherein the operating state of the refrigerator is informed by periodically alternating a color of the at least one of the first door and or the second door.

* * * * *